(12) United States Patent
Sekiguchi et al.

(10) Patent No.: US 12,333,758 B2
(45) Date of Patent: Jun. 17, 2025

(54) VISUAL FEEDBACK CONTROLLER

(71) Applicant: Mitsubishi Electric Corporation, Tokyo (JP)

(72) Inventors: Hiroyuki Sekiguchi, Tokyo (JP); Takeyuki Kawata, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 423 days.

(21) Appl. No.: 17/926,641

(22) PCT Filed: Jul. 7, 2020

(86) PCT No.: PCT/JP2020/026601
§ 371 (c)(1),
(2) Date: Nov. 21, 2022

(87) PCT Pub. No.: WO2022/009318
PCT Pub. Date: Jan. 13, 2022

(65) Prior Publication Data
US 2023/0196614 A1 Jun. 22, 2023

(51) Int. Cl.
*G06T 7/73* (2017.01)
*G05B 19/418* (2006.01)
*G06T 1/00* (2006.01)
*G06T 1/60* (2006.01)

(52) U.S. Cl.
CPC .......... *G06T 7/74* (2017.01); *G05B 19/41875* (2013.01); *G06T 1/0014* (2013.01); *G06T 1/60* (2013.01); *G05B 2219/32368* (2013.01)

(58) Field of Classification Search
None
See application file for complete search history.

(56) References Cited

U.S. PATENT DOCUMENTS

2003/0193560 A1  10/2003  Oh et al.

FOREIGN PATENT DOCUMENTS

| JP | 2001-52183 A | 2/2001 |
|----|--------------|--------|
| JP | 2003-316441 A | 11/2003 |
| JP | 2009-93412 A | 4/2009 |
| JP | 2012-48593 A | 3/2012 |

OTHER PUBLICATIONS

International Search Report and Written Opinion mailed on Oct. 13, 2020, received for PCT Application PCT/JP2020/026601, filed on Jul. 7, 2020, 9 pages including English Translation.

*Primary Examiner* — Sean Shechtman
(74) *Attorney, Agent, or Firm* — XSENSUS LLP

(57) ABSTRACT

A visual feedback controller includes: a camera that outputs a target object image; a template image storage unit that stores a template image; an image processing unit that uses the target object image and the template image to measure an actual position of a target object with subpixel accuracy, and outputs the measured actual position as an image processing measurement value; a drive command generation unit that generates a drive command signal; an error compensation control unit that compensates an error of the drive command signal using the image processing measurement value and generates a drive compensation signal; a machine drive unit that changes a position of a machine tip relative to the target object based on the drive compensation signal; and a template image analysis unit that analyzes the template image, calculates measurement accuracy of the image processing measurement value, and outputs the calculated measurement accuracy.

10 Claims, 15 Drawing Sheets

VISUAL FEEDBACK CONTROLLER

CROSS-REFERENCE TO RELATED APPLICATION

The present application is based on PCT filing PCT/JP2020/026601, filed Jul. 7, 2020, the entire contents of which are incorporated herein by reference.

FIELD

The present disclosure relates to a visual feedback controller that controls a mechanical system using an image.

BACKGROUND

Devices such as an electronic chip mounting machine and an inspection device need to position a machine tip holding an electronic component or the like with high accuracy with respect to a target position on an electronic board or the like. Many devices do not directly measure a relative position error, that is, a relative error between the target position and the machine tip, but indirectly measure the relative error using, for example, an encoder attached to a motor that moves the machine tip. The method of indirectly measuring the relative error may not be able to eliminate the actual relative error between the target position and the machine tip, and cannot be used in applications requiring particularly high accuracy. As a method of directly measuring the relative error, an image of a moving object can be captured by a camera, and a distance by which the moving object actually travels when the moving object travels from one point to another point can be calculated using the image captured by the camera, so that the amount of travel of the moving object can be controlled. However, in a method of calculating the distance of travel per pixel of an image, positioning control with a resolution finer than one pixel is impossible.

To address such a problem, Patent Literature 1 discloses a technique in which an image processing apparatus uses a template image to search for an object on a search image with subpixel accuracy that is finer than one pixel accuracy. The image processing apparatus described in Patent Literature 1 repeats processing of roughly searching for an object on a search image, calculating an error of a template image with respect to the object on the search image by using the template image placed at the position of the rough search and the search image, shifting the template image by an amount corresponding to the error, and calculating the error of the template image with respect to the object. The image processing apparatus described in Patent Literature 1 can measure the position of the object on the search image with subpixel accuracy by converging the error of the template image with respect to the object on the search image.

CITATION LIST

Patent Literature

Patent Literature 1: Japanese Patent Application Laid-open No. 2012-48593

SUMMARY

Technical Problem

Although the technique described in Patent Literature 1 can measure the position of the search object from the captured image with subpixel accuracy, a reliable resolution of the measurement position is unknown because the technique uses a method of searching. Therefore, there has been a problem in that it is difficult to determine whether or not it is appropriate to use the image processing apparatus of Patent Literature 1 for a mechanical device requiring particularly high positioning accuracy.

The present disclosure has been made in view of the above, and an object thereof is to provide a visual feedback controller capable of calculating accuracy of a measurement position obtained by image processing.

Solution to Problem

To solve the above problem and achieve an object, the present disclosure is directed to a visual feedback controller to control a positioning operation that positions a machine tip at a position of a target object. The visual feedback controller includes: a camera to capture an image of the target object and output the captured image as a target object image; a template image storage unit to store a template image obtained by capturing an image of the target object in advance; an image processing unit to use the target object image and the template image to measure an actual position of the target object with subpixel accuracy, which provides a higher accuracy than a size of a pixel in the target object image and the template image, and output the measured actual position as an image processing measurement value; and a drive command generation unit to generate a drive command signal that is a command for controlling a positioning operation of a machine drive unit to which the machine tip is connected. Furthermore, the visual feedback controller includes an error compensation control unit to compensate an error of the drive command signal using the image processing measurement value such that the machine tip is positioned at the position of the target object, and generate a drive compensation signal; the machine drive unit to change a position of the machine tip relative to the target object on the basis of the drive compensation signal; and a template image analysis unit to analyze the template image, calculate measurement accuracy of the image processing measurement value, and output the calculated measurement accuracy as an image processing accuracy analytical value.

Advantageous Effects of Invention

According to the present disclosure, the visual feedback controller can calculate the accuracy of the measurement position obtained by the image processing.

DESCRIPTION OF EMBODIMENTS

Hereinafter, a visual feedback controller according to embodiments of the present disclosure will be described in detail with reference to the drawings.

First Embodiment

Figure 1:
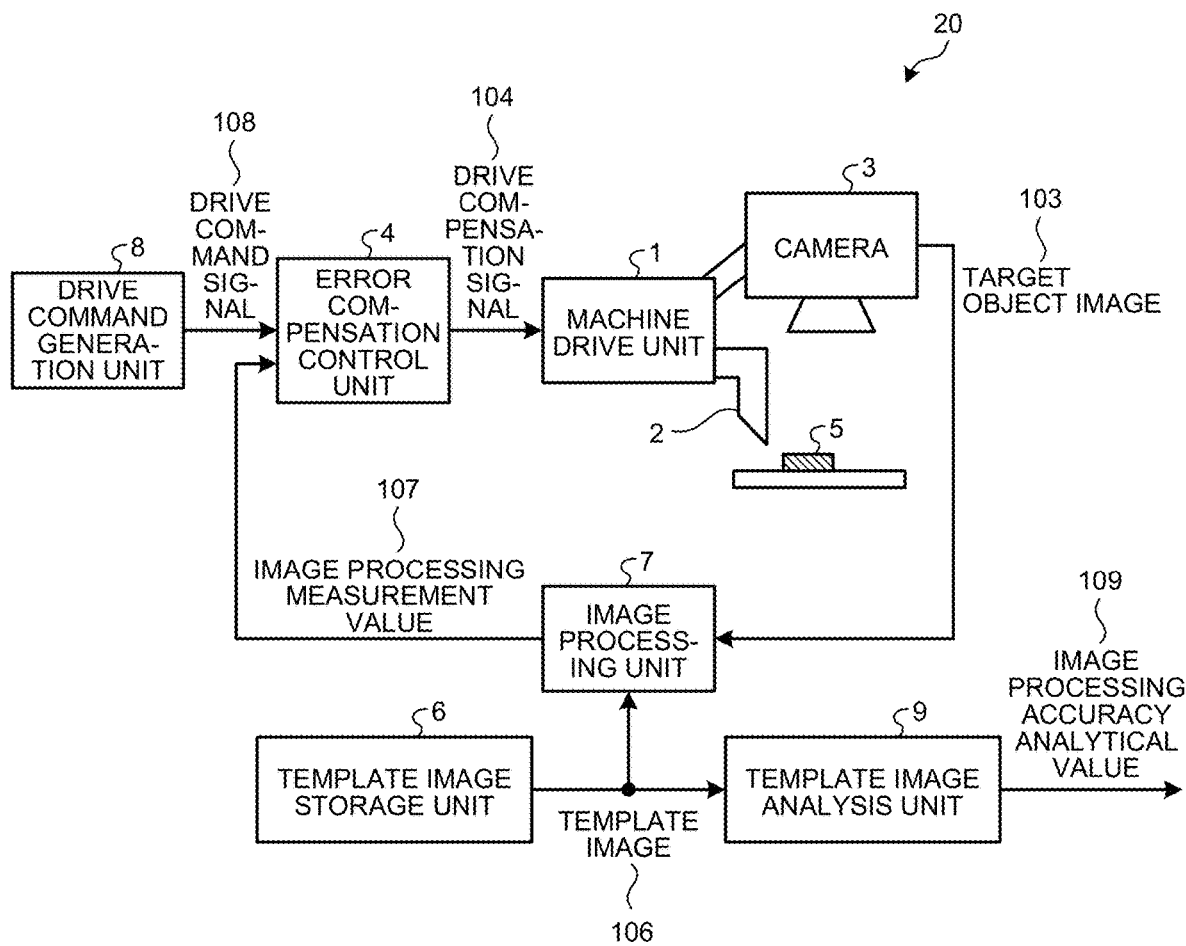
FIG. 1 is a block diagram illustrating an example of a configuration of a visual feedback controller according to a first embodiment.

FIG. 1 is a block diagram illustrating an example of a configuration of a visual feedback controller 20 according to a first embodiment. The visual feedback controller 20 is a device that controls a positioning operation for positioning a machine tip 2 at a position of a target object 5. The visual feedback controller 20 includes a machine drive unit 1, the machine tip 2, a camera 3, an error compensation control unit 4, a template image storage unit 6, an image processing unit 7, a drive command generation unit 8, and a template image analysis unit 9.

The machine drive unit 1 changes a position of the machine tip 2 relative to the target object 5 on the basis of a drive compensation signal 104 generated by the error compensation control unit 4. The machine drive unit 1 is mechanically connected to the machine tip 2 and the camera 3. The machine drive unit 1 performs a positioning operation of the machine tip 2 and the camera 3 together in accordance with the drive compensation signal 104 output from the error compensation control unit 4. The machine tip 2 has a function of acting on the target object 5, and is positioned with respect to a position where the target object 5 is placed. The camera 3 captures an image of the target object 5, which is in practice a range including the target object 5, and outputs the captured image as a target object image 103.

The template image storage unit 6 stores an image of a range including the target object 5 captured in advance as a template image 106. The image processing unit 7 performs image processing using the template image 106 and the target object image 103, measures a position of the target object 5 captured in the target object image 103, and outputs a result of the measurement of the position of the target object 5 as an image processing measurement value 107. The image processing unit 7 uses the target object image 103 and the template image 106 to measure the actual position of the target object 5 with subpixel accuracy, which is higher than accuracy corresponding to a pixel size of an image element in the target object image 103 and the template image 106, and outputs the measured value as the image processing measurement value 107. Note that "image element" and "pixel" are synonymous.

The drive command generation unit 8 generates a drive command signal 108 that is a command for controlling the positioning operation of the machine drive unit 1 such that the machine tip 2 is positioned with respect to the target object 5. The error compensation control unit 4 uses the drive command signal 108 and the image processing measurement value 107 to generate the drive compensation signal 104 such that the machine tip 2 can be positioned with respect to the target object 5, and outputs the drive compensation signal to the machine drive unit 1.

Specifically, the error compensation control unit 4 uses the image processing measurement value 107 to compensation an error of the drive command signal 108 such that the machine tip 2 is positioned at the position of the target object 5, and generates the drive compensation signal 104.

The template image analysis unit 9 analyzes the template image 106, calculates measurement accuracy of the image processing measurement value 107 output from the image processing unit 7, and outputs the calculated measurement accuracy as an image processing accuracy analytical value 109.

Figure 2:
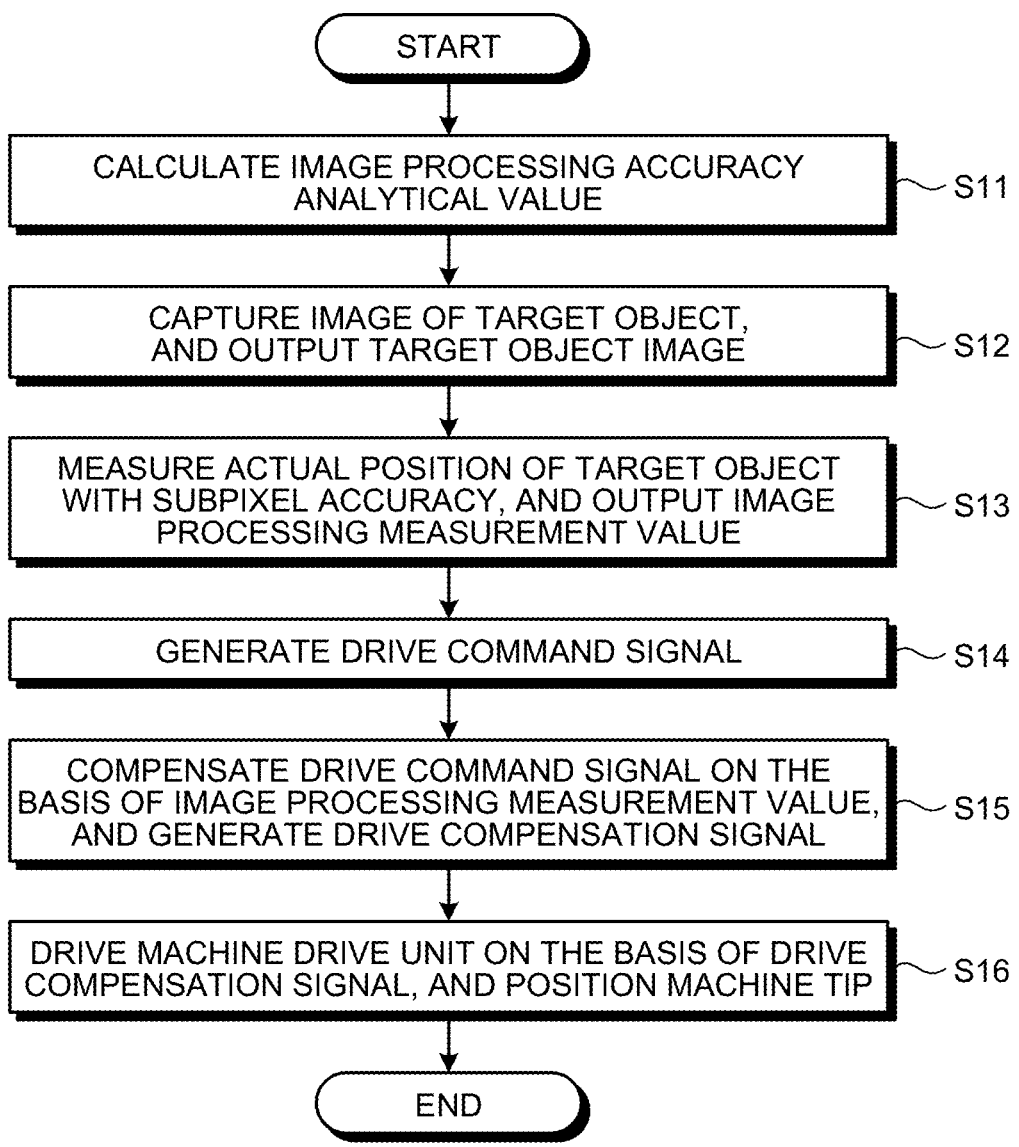
FIG. 2 is a flowchart illustrating an operation of the visual feedback controller according to the first embodiment.

Next, an operation of the visual feedback controller 20 will be described. FIG. 2 is a flowchart illustrating the operation of the visual feedback controller 20 according to the first embodiment. The visual feedback controller 20 positions the machine tip 2 with respect to the target object 5 being placed, and performs work on the target object 5. The work performed on the target object 5 by the visual feedback controller 20 includes, for example, work of placing an electronic component held by the machine tip 2 on the target object 5 that is a terminal portion on an electronic board or the like, or work of inspecting the target object 5 by bringing an inspector attached to the machine tip 2 into contact with the target object. Since these types of work require high accuracy, the visual feedback controller 20 needs to position the machine tip 2 with high accuracy with respect to the target object 5.

The machine drive unit 1 is mechanically connected to the machine tip 2, and is driven in accordance with the drive compensation signal 104 to position the machine tip 2. The error compensation control unit 4 generates the drive compensation signal 104 such that the machine tip 2 is positioned with high accuracy with respect to the target object 5 by calculation such as proportional integral or filter processing on the basis of the drive command signal 108 and the image processing measurement value 107. The drive command generation unit 8 generates the drive command signal 108 on the basis of the position of the target object 5 known in advance such that the machine tip 2 is positioned with respect to the target object 5.

Here, an error may occur between the actual position of the target object 5 and the position of the target object 5 known in advance. Such error is caused due to an individual difference of the target object 5, a shift at the time of placement of the target object 5, vibration of a structure such as a stage on which the target object 5 is placed, or the like. Therefore, even when the machine drive unit 1 is driven on the basis of the drive command signal 108 to position the machine tip 2, an error occurs between the machine tip 2 and the target object 5.

In the present embodiment, in the visual feedback controller 20, the template image analysis unit 9 analyzes the template image 106 stored in the template image storage unit 6, and calculates the image processing accuracy analytical value 109 as the accuracy of the image processing measurement value 107 output by the image processing unit 7 (step S11). The need for operation and detailed operation of the template image analysis unit 9 will be described later.

The machine drive unit 1 is mechanically connected to the camera 3. The camera 3 captures an image of the target object 5, and outputs the captured image as the target object image 103 (step S12). The image processing unit 7 performs image processing using the target object image 103 and the template image 106 stored in the template image storage unit 6, detects the target object 5 from the target object image 103, and measures the position, angle of rotation, and the like of the target object 5. The image processing unit 7 measures the actual position of the target object 5 with subpixel accuracy, which provides a higher accuracy than the pixel size of the target object image 103, and outputs the measured value as the image processing measurement value 107 (step S13). The drive command generation unit 8 generates the drive command signal 108 on the basis of the position of the target object 5 known in advance (step S14). Since the actual position of the target object 5 can be known from the image processing measurement value 107, the error compensation control unit 4 compensates the drive command signal 108 on the basis of the image processing measurement value 107 such that the machine tip 2 is positioned with high accuracy with respect to the target object 5, and generates the drive compensation signal 104 (step S15). The machine drive unit 1 is driven on the basis of the drive compensation signal 104 to position the machine tip 2 (step S16). The visual feedback controller 20 can repeatedly perform the operations from step S12 to step S16 until the positioning is completed.

The positioning accuracy of the machine tip 2 is affected by the accuracy of the image processing measurement value 107 output by the image processing unit 7. In order to obtain the image processing measurement value 107 with high accuracy, the image processing unit 7 can use the target object image 103 and the template image 106 having a high resolution, that is, a large number of pixels. However, the use of the target object image 103 and the template image 106 having a large number of pixels in the image processing unit 7 may be inappropriate due to constraints such as an increase in the amount of image transfer and the need for an expensive high-resolution camera. It is thus considered that the image processing unit 7 obtains the image processing measurement value 107 with accuracy that provides a size finer than the pixel size, that is, subpixel accuracy, by image processing using the target object image 103 and the template image 106 having a small number of pixels. An image processing method by which the image processing unit 7 obtains the image processing measurement value 107 with subpixel accuracy using the target object image 103 and the template image 106 having a small number of pixels includes phase only correlation (POC), pattern matching, deep learning, or the like. Here, as an example, a case where the image processing unit 7 uses the phase only correlation will be described.

The image processing unit 7 performs two-dimensional discrete Fourier transform on the target object image 103 and the template image 106 using the phase only correlation, and calculates a correlation power spectrum using phase components obtained. The image processing unit 7 calculates a phase only correlation function by performing two-dimensional inverse discrete Fourier transform on the correlation power spectrum that has been normalized. The phase only correlation function indicates a position at which the template image 106 matches the target object image 103. Therefore, by calculating the phase only correlation function, the image processing unit 7 can measure the position of the target object 5 in the target object image 103, thereby outputting the result of the measurement of the position of the target object 5 as the image processing measurement value 107. In the phase only correlation, the image processing unit 7 calculates the correlation of the template image 106 with respect to the target object image 103 using the phase components obtained by the two-dimensional discrete Fourier transform, so that the complexity of the target object image 103 and the template image 106 including various frequency components affects the accuracy of the position measurement. That is, the image being used affects the accuracy of the position measurement, so that the image processing method performed by the image processing unit 7 alone cannot specify the accuracy of the image processing measurement value 107.

Therefore, in the present embodiment, as in step S11, before the image processing measurement value 107 is calculated by the image processing unit 7 and used for positioning control of the machine tip 2, the template image analysis unit 9 analyzes the template image 106 stored in the template image storage unit 6 in advance, and calculates the image processing accuracy analytical value 109 that serves as the accuracy of the image processing measurement value 107 output by the image processing unit 7.

Figure 3:
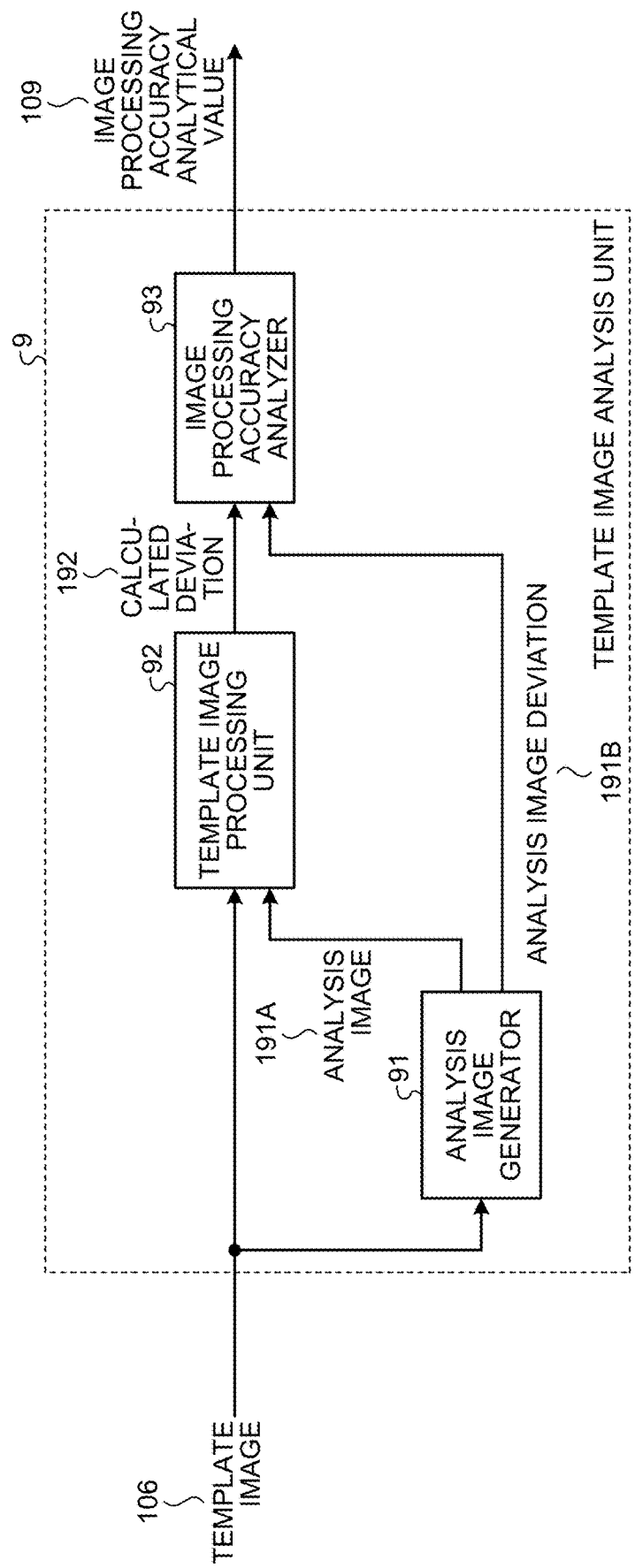
FIG. 3 is a block diagram illustrating an example of a configuration of a template image analysis unit included in the visual feedback controller according to the first embodiment.
Figure 4:
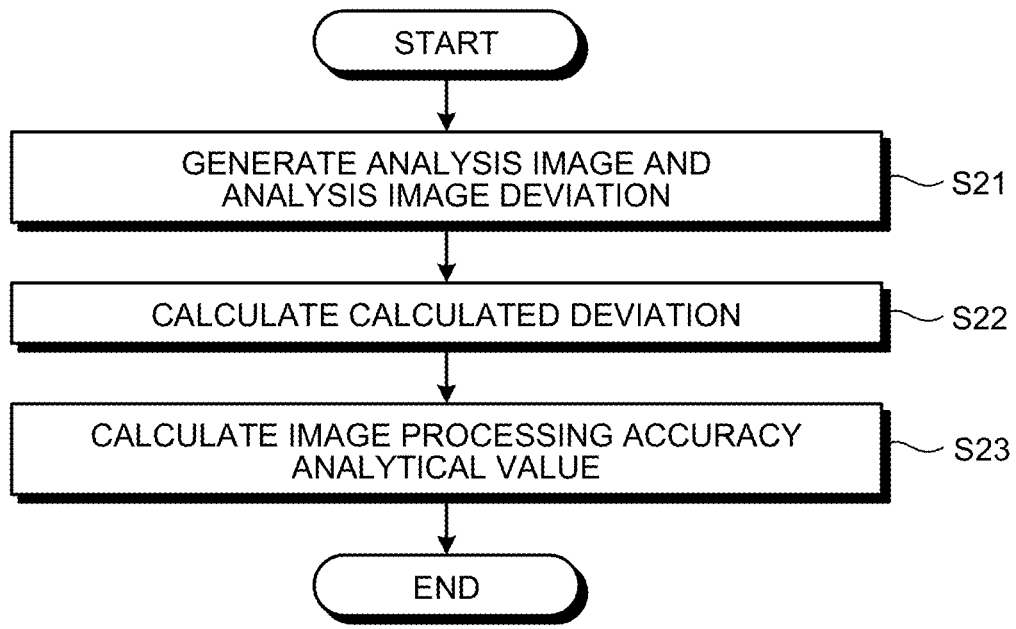
FIG. 4 is a flowchart illustrating an operation of the template image analysis unit included in the visual feedback controller according to the first embodiment.

A method of analyzing the template image 106 by the template image analysis unit 9 will be described with reference to FIGS. 3 and 4. FIG. 3 is a block diagram illustrating an example of a configuration of the template image analysis unit 9 included in the visual feedback controller 20 according to the first embodiment. FIG. 4 is a flowchart illustrating an operation of the template image analysis unit 9 included in the visual feedback controller 20 according to the first embodiment. The operation of the template image analysis unit 9 illustrated in FIG. 4 illustrates details of the operation in step S11 of the flowchart illustrated in FIG. 2. The template image analysis unit 9 includes an analysis image generator 91, a template image processing unit 92, and an image processing accuracy analyzer 93.

The analysis image generator 91 generates an analysis image 191A and an analysis image deviation 191B from the template image 106, and outputs the generated analysis image and analysis image deviation (step S21). Specifically, the analysis image generator 91 generates the analysis image 191A that is shifted from the template image 106 by a prescribed distance. The prescribed distance is not in units of one pixel, but is expressed as the number of pixels including a decimal fraction. When the prescribed distance is a distance "L" and "N" is an integer, the distance "L" has a value satisfying N<L<N+1. That is, the analysis image generator 91 generates the analysis image 191A obtained by shifting the template image 106 by an amount corresponding to a decimal value with respect to one pixel of the template image 106. At this time, the analysis image generator 91 generates the analysis image 191A by performing appropriate filter processing on the analysis image 191A shifted. Moreover, the analysis image generator 91 outputs the distance of the shift for which any value is allowable as the analysis image deviation 191B. In the following description, the analysis image deviation 191B may be referred to as an amount of shift of the analysis image 191A with respect to the template image 106.

The template image processing unit 92 calculates and outputs a calculated deviation 192 as a result of image processing using the template image 106 and the analysis image 191A (step S22). Specifically, the template image processing unit 92 uses the template image 106 and the analysis image 191A to perform image processing of the same method as that used by the image processing unit 7, and calculates an amount of deviation between the analysis image 191A and the template image 106. That is, the template image processing unit 92 uses the analysis image 191A and the template image 106 to measure the amount of deviation between the analysis image 191A and the template image 106 by the same method as that used by the image processing unit 7. The template image processing unit 92 outputs the calculated amount of deviation as the calculated deviation 192.

The image processing accuracy analyzer 93 calculates the image processing accuracy analytical value 109 from the calculated deviation 192 and the analysis image deviation 191B (step S23). Specifically, from a difference between the calculated deviation 192 and the analysis image deviation 191B, the image processing accuracy analyzer 93 can know the accuracy of the position measurement of the target object 5 when the template image 106 is used in the image processing by the image processing unit 7. The analysis image deviation 191B is the distance of the shift when the analysis image 191A is generated from the template image 106 known in advance. The image processing accuracy analyzer 93 calculates the image processing accuracy analytical value 109 on the basis of the accuracy of the position measurement.

Next, a hardware configuration of the visual feedback controller 20 will be described. In the visual feedback controller 20, the machine drive unit 1 is a device including an actuator such as a motor. The camera 3 is a measuring instrument such as a digital camera. The template image storage unit 6 is a memory. The error compensation control unit 4, the template image storage unit 6, the image processing unit 7, the drive command generation unit 8, and the template image analysis unit 9 are implemented by processing circuitry. The processing circuitry may include a memory and a processor executing programs stored in the memory, or may include dedicated hardware.

Figure 5:
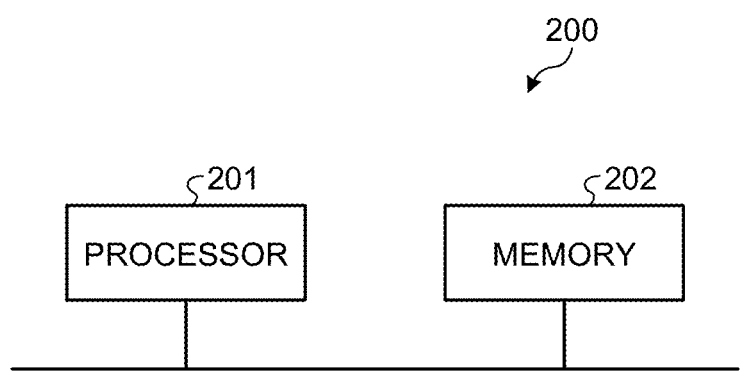
FIG. 5 is a diagram illustrating an example of a case where processing circuitry included in the visual feedback controller according to the first embodiment includes a processor and a memory.

FIG. 5 is a diagram illustrating an example of a case where processing circuitry 200 included in the visual feedback controller 20 according to the first embodiment includes a processor 201 and a memory 202. In the case where the processing circuitry 200 includes the processor 201 and the memory 202, each function of the processing circuitry 200 of the visual feedback controller 20 is implemented by software, firmware, or a combination of software and firmware. The software or firmware is described as programs and stored in the memory 202. The processing circuitry 200 implements each function by the processor 201 reading and executing the programs stored in the memory 202. That is, the processing circuitry 200 includes the memory 202 for storing the programs that result in the execution of the processing of the visual feedback controller 20. It can also be said that these programs cause a computer to execute procedure and method related to the visual feedback controller 20.

Here, the processor 201 may be a central processing unit (CPU), a processing unit, an arithmetic unit, a microprocessor, a microcomputer, a digital signal processor (DSP), or the like. Moreover, the memory 202 corresponds to, for example, a non-volatile or volatile semiconductor memory such as a random access memory (RAM), a read only memory (ROM), a flash memory, an erasable programmable ROM (EPROM), or an electrically EPROM (EEPROM (registered trademark)), a magnetic disk, a flexible disk, an optical disk, a compact disc, a mini disc, a digital versatile disc (DVD), or the like.

Figure 6:
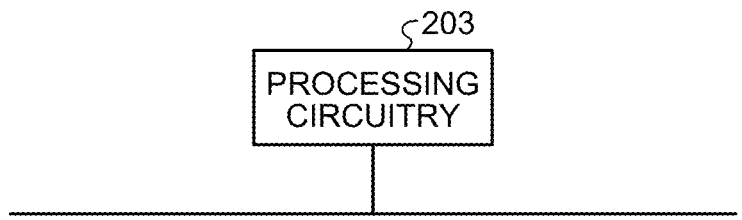
FIG. 6 is a diagram illustrating an example of a case where the processing circuitry included in the visual feedback controller according to the first embodiment includes dedicated hardware.

FIG. 6 is a diagram illustrating an example of processing circuitry 203 included in the visual feedback controller 20 according to the first embodiment that includes dedicated hardware. When the processing circuitry 203 includes the dedicated hardware, the processing circuitry 203 illustrated in FIG. 6 corresponds to, for example, a single circuit, a complex circuit, a programmed processor, a parallel-programmed processor, an application specific integrated circuit (ASIC), a field programmable gate array (FPGA), or a combination thereof. The functions of the visual feedback controller 20 may be implemented individually or collectively by the processing circuitry 203.

Note that the functions of the visual feedback controller 20 may be implemented partly by dedicated hardware and partly by software or firmware. The processing circuitry can thus implement each function described above by the dedicated hardware, software, firmware, or a combination thereof.

As described above, according to the present embodiment, in the visual feedback controller 20, the template image analysis unit 9 analyzes the template image 106 stored in the template image storage unit 6, thereby calculating the image processing accuracy analytical value 109 that allows grasping in advance the measurement accuracy of the image processing measurement value 107 output by the image processing unit 7. As a result, a user of the visual feedback controller 20 can grasp the accuracy of the image processing measurement value 107 output by the image processing unit 7, and can grasp the accuracy when the machine tip 2 is positioned with respect to the target object 5.

Note that, in the present embodiment, the template image analysis unit 9 may generate the analysis image 191A, the analysis image deviation 191B, and the calculated deviation 192 a plurality of times. In this case, the template image analysis unit 9 calculates the image processing accuracy analytical value 109 using the analysis image 191A, the analysis image deviation 191B, and the calculated deviation 192 generated in each processing. The template image analysis unit 9 may output, for example, the worst value among a plurality of the image processing accuracy analytical values 109 calculated, as the image processing accuracy analytical value 109.

Figure 7:
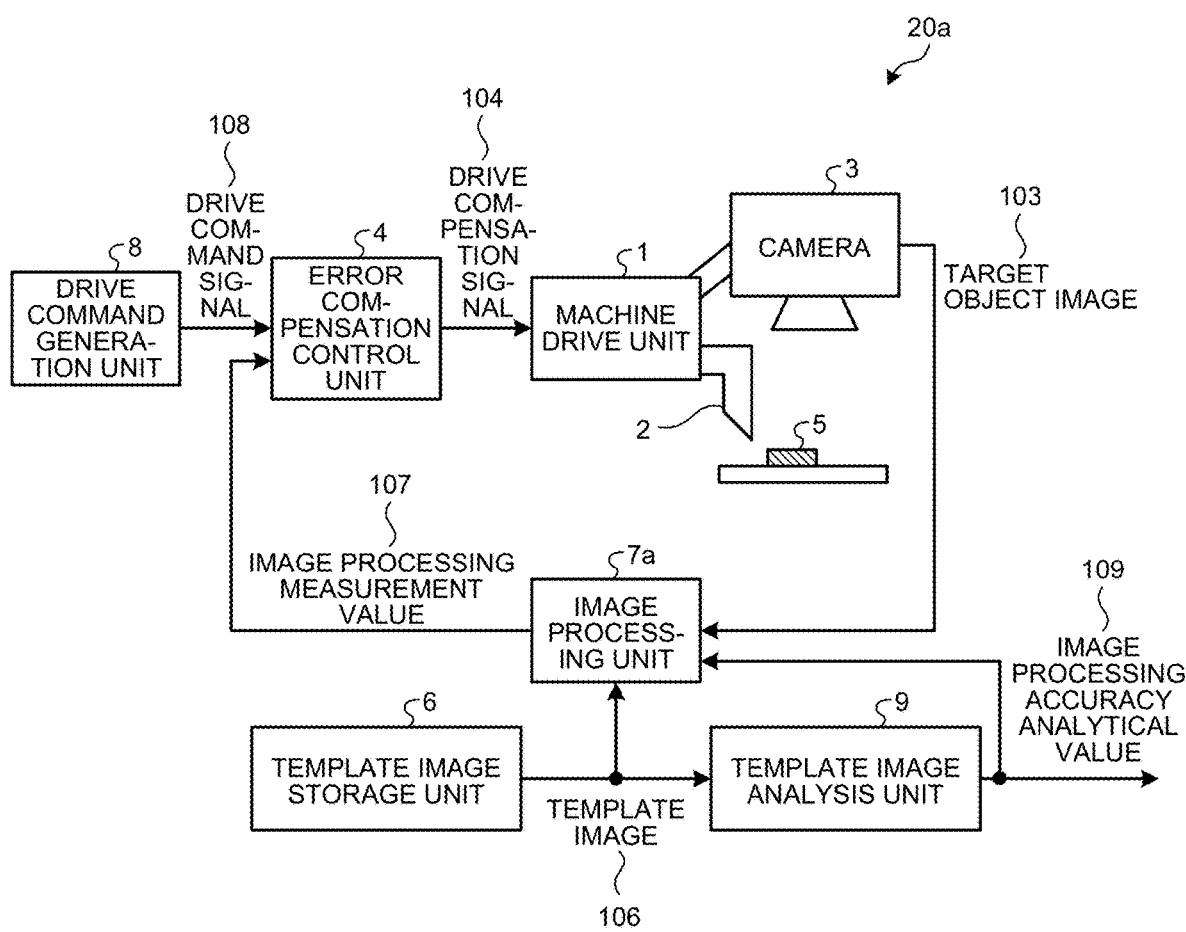
FIG. 7 is a block diagram illustrating an example of another configuration of the visual feedback controller according to the first embodiment.

Also, in the present embodiment, the image processing accuracy analytical value 109 calculated by the template image analysis unit 9 is used for the user to grasp the accuracy of the image processing measurement value 107 output by the image processing unit 7, but the present disclosure is not limited thereto. The image processing accuracy analytical value 109 may also be used in the visual feedback controller. FIG. 7 is a block diagram illustrating an example of another configuration of a visual feedback controller 20a according to the first embodiment. The visual feedback controller 20a is obtained by modifying the visual feedback controller 20 illustrated in FIG. 1, that is, replacing the image processing unit 7 with an image processing unit 7a. In the visual feedback controller 20a, the template image analysis unit 9 outputs the image processing accuracy analytical value 109 calculated to the image processing unit 7a. The image processing unit 7a can output the image processing measurement value 107 rounded at a resolution determined by the image processing accuracy analytical value 109. That is, the image processing unit 7a determines the resolution of the image processing measurement value 107 to be output on the basis of the image processing accuracy analytical value 109. As a result, when generating the drive compensation signal 104 using the image processing measurement value 107, the error compensation control unit 4 does not need to perform calculation using a value having an unnecessarily large number of digits and thus can reduce the calculation load.

Moreover, the present embodiment has described that the phase only correlation is specifically used as the image processing method of the image processing unit 7, but pattern matching, deep learning, or the like may be used as described above. In this case, the template image analysis unit 9 need only calculate the image processing accuracy analytical value 109 using the same image processing method as that used by the image processing unit 7.

Moreover, in the present embodiment, the camera 3 is mechanically connected to the machine drive unit 1 in the visual feedback controller 20 on the assumption that a plurality of the target objects 5 is present and is in a plurality of places or in indefinite places. However, when the place of the target object 5 is determined, in the visual feedback controller 20, the camera 3 may be fixed and installed at a place where an image of the target object 5 can be captured.

Moreover, in the visual feedback controller 20 of the present embodiment, the machine tip 2 and the camera 3 are mechanically connected to the machine drive unit 1, but the present disclosure is not limited thereto. The visual feedback controller 20 may be configured such that the machine tip 2 and the camera 3 are fixed, the target object 5 is mechanically connected to the machine drive unit 1, and the target object 5 is positioned with respect to the machine tip 2.

Second Embodiment

In a second embodiment, a visual feedback controller includes an analysis template image storage unit that stores an analysis template image. Differences from the first embodiment will be described.

Figure 8:
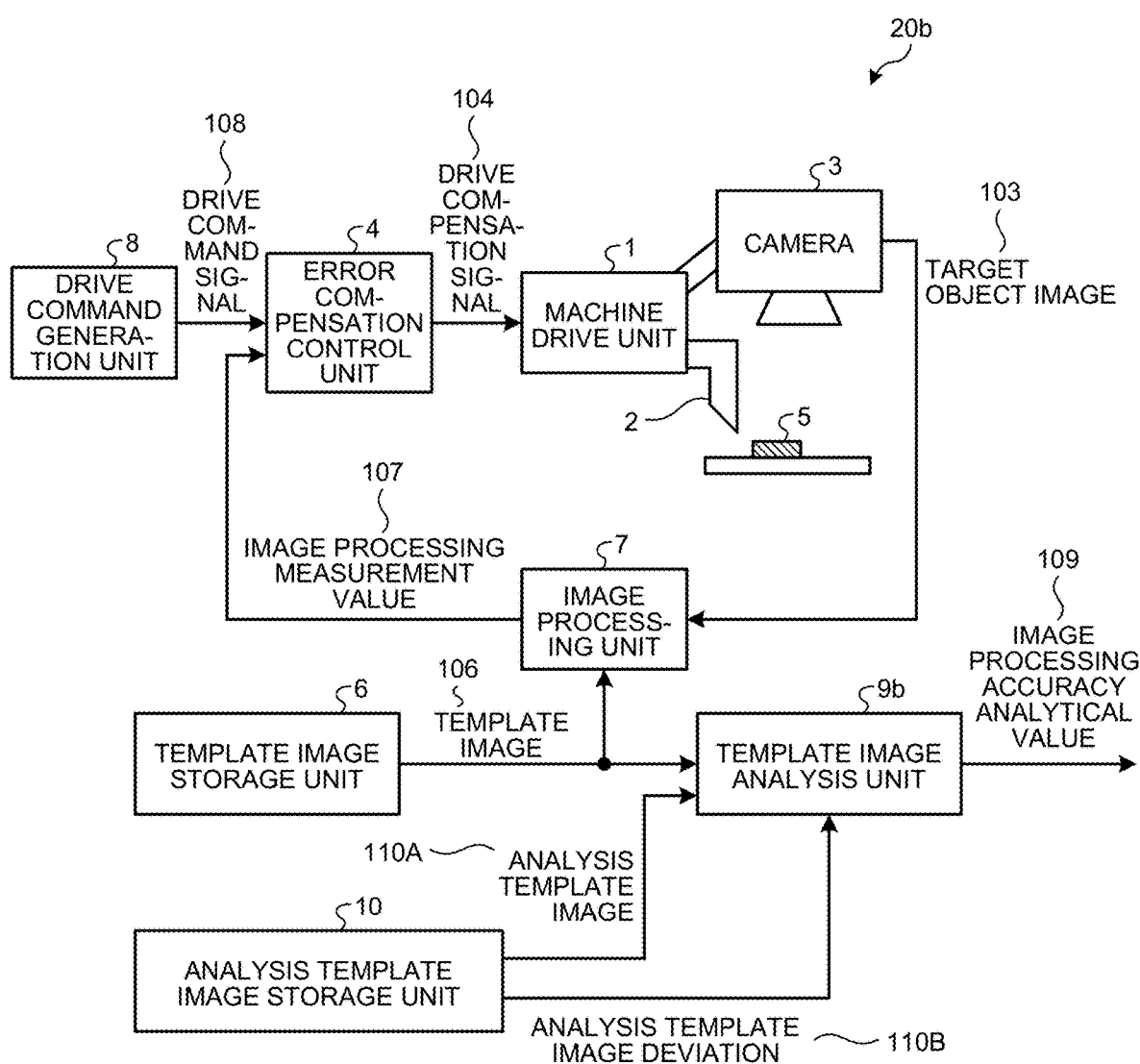
FIG. 8 is a block diagram illustrating an example of a configuration of a visual feedback controller according to a second embodiment.

FIG. 8 is a block diagram illustrating an example of a configuration of a visual feedback controller 20b according to the second embodiment. The visual feedback controller 20b is obtained by modifying the visual feedback controller 20 of the first embodiment illustrated in FIG. 1, that is, replacing the template image analysis unit 9 with a template image analysis unit 9b and further adding an analysis template image storage unit 10.

Next, an operation of the visual feedback controller 20b will be described. Note that a flowchart illustrating the operation of the visual feedback controller 20b is similar to the flowchart illustrating the operation of the visual feedback controller 20 of the first embodiment illustrated in FIG. 2. The analysis template image storage unit 10 stores an analysis template image 110A, which is captured by shifting an imaging range of the template image 106 stored in the template image storage unit 6 by a prescribed distance, and an analysis template image deviation 110B indicating the prescribed distance. That is, the analysis template image storage unit 10 stores the analysis template image 110A captured with shifting the imaging range of the template image 106 by the prescribed distance. The prescribed distance is not in units of one pixel, but is the number of pixels including a decimal fraction.

Figure 9:
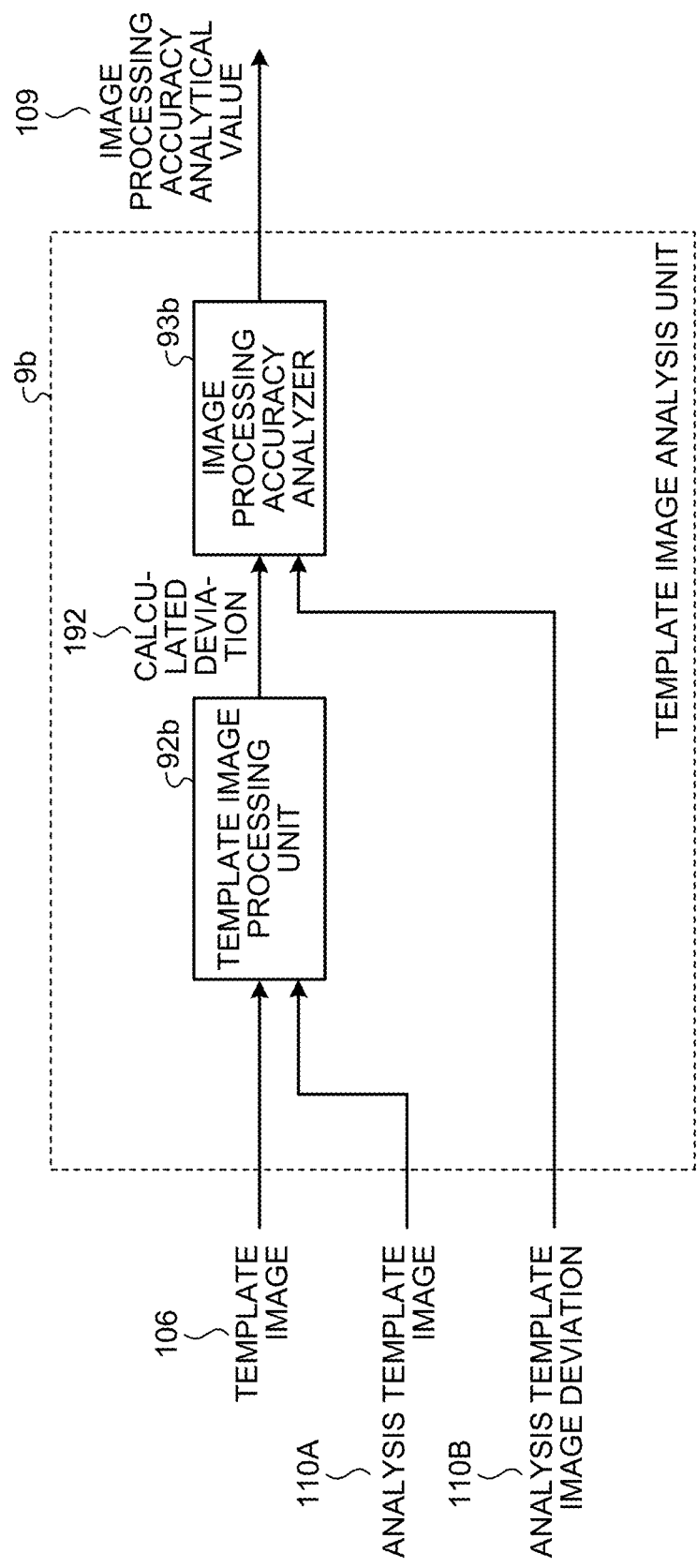
FIG. 9 is a block diagram illustrating an example of a configuration of a template image analysis unit included in the visual feedback controller according to the second embodiment.
Figure 10:
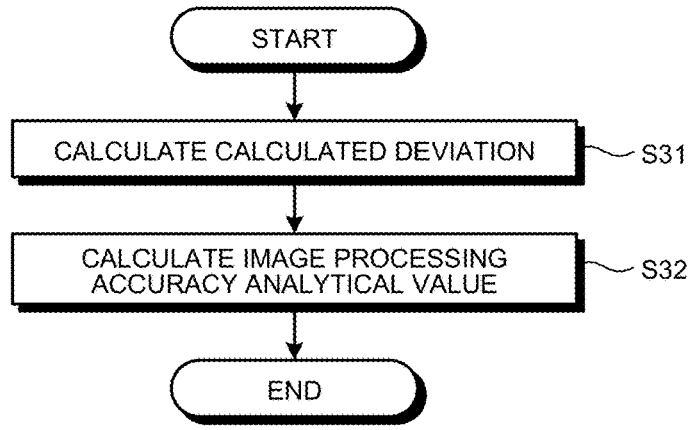
FIG. 10 is a flowchart illustrating an operation of the template image analysis unit included in the visual feedback controller according to the second embodiment.

The template image analysis unit 9b uses the template image 106 and the analysis template image 110A to calculate measurement accuracy of the image processing measurement value 107, and outputs the calculated measurement accuracy as the image processing accuracy analytical value 109. A method of analyzing the template image 106 by the template image analysis unit 9b will be described with reference to FIGS. 9 and 10. FIG. 9 is a block diagram illustrating an example of a configuration of the template image analysis unit 9b included in the visual feedback controller 20b according to the second embodiment. FIG. 10 is a flowchart illustrating an operation of the template image analysis unit 9b included in the visual feedback controller 20b according to the second embodiment. The operation of the template image analysis unit 9b illustrated in FIG. 10 illustrates details of the operation in step S11 of the flowchart illustrated in FIG. 2. The template image analysis unit 9b includes a template image processing unit 92b and an image processing accuracy analyzer 93b.

The template image processing unit 92b calculates and outputs the calculated deviation 192 as a result of image processing using the template image 106 and the analysis template image 110A (step S31). Specifically, the template image processing unit 92b uses the template image 106 and the analysis template image 110A to perform image processing of the same method as that used by the image processing unit 7, and calculates an amount of deviation between the analysis template image 110A and the template image 106. The template image processing unit 92b outputs the calculated amount of deviation as the calculated deviation 192.

The image processing accuracy analyzer 93b calculates the image processing accuracy analytical value 109 from the calculated deviation 192 and the analysis template image deviation 110B (step S32). Specifically, from a difference between the calculated deviation 192 and the analysis template image deviation 110B, which is the distance obtained from shifting the analysis template image 110A is generated known in advance, the image processing accuracy analyzer 93b can know the accuracy of the position measurement of the target object 5 when the template image 106 is used in the image processing performed by the image processing unit 7. The image processing accuracy analyzer 93b calculates the image processing accuracy analytical value 109 on the basis of the accuracy of the position measurement.

A hardware configuration of the visual feedback controller 20b will be described. In the visual feedback controller 20b, the analysis template image storage unit 10 is a memory. The other configurations of the visual feedback controller 20b are similar to those of the visual feedback controller 20 of the first embodiment.

As described above, according to the present embodiment, in the visual feedback controller 20b, the template image analysis unit 9b analyzes the template image 106 stored in the template image storage unit 6 and the analysis template image 110A stored in the analysis template image storage unit 10, thereby calculating the image processing accuracy analytical value 109 that allows grasping in advance the accuracy of the image processing measurement value 107 output by the image processing unit 7. As a result, a user of the visual feedback controller 20b can grasp the accuracy of the image processing measurement value 107 output by the image processing unit 7, and can grasp the accuracy when the machine tip 2 is positioned with respect to the target object 5.

Note that in the present embodiment, the analysis template image storage unit 10 may store a plurality of the analysis template images 110A captured by shifting the imaging range of the template image 106 stored in the template image storage unit 6 by the prescribed distance. In this case, the template image analysis unit 9b uses the plurality of the analysis template images 110A and the template image 106 to calculate the image processing accuracy analytical value 109. Specifically, the template image analysis unit 9b calculates the image processing accuracy analytical value 109 on the basis of a result of calculation of the amount of deviation calculated for each of the plurality of the analysis template images 110A. The template image analysis unit 9b may output, for example, the worst value among a plurality of the image processing accuracy analytical values 109 calculated as the image processing accuracy analytical value 109.

Also, in the present embodiment, the template image analysis unit 9b may calculate the image processing accuracy analytical value 109 using the analysis template image 110A and the template image 106, or a plurality of the analysis template images 110A, or a plurality of the analysis template images 110A and the template image 106. In this case, as with the template image analysis unit 9 of the first embodiment, the template image analysis unit 9b generates the analysis image 191A shifted from the template image 106 by the prescribed distance, and calculates the image processing accuracy analytical value 109 using the analysis image 191A and the template image 106.

Moreover, in the present embodiment, the image processing accuracy analytical value 109 calculated by the template image analysis unit 9b may be used in a visual feedback controller similar to the visual feedback controller 20a of the first embodiment illustrated in FIG. 7. Although not illustrated, in the visual feedback controller, the template image analysis unit 9b outputs the image processing accuracy analytical value 109 calculated to the image processing unit 7a. The image processing unit 7a can output the image processing measurement value 107 rounded at a resolution determined by the image processing accuracy analytical value 109. That is, the image processing unit 7a determines the resolution of the image processing measurement value 107 to be output on the basis of the image processing accuracy analytical value 109. As a result, when generating the drive compensation signal 104 using the image processing measurement value 107, the error compensation control unit 4 does not need to perform calculation using a value having an unnecessarily large number of digits and thus can reduce the calculation load.

Third Embodiment

In a third embodiment, a visual feedback controller includes a high-pixel template image storage unit that stores a high-pixel template image. Differences from the first embodiment will be described.

Figure 11:
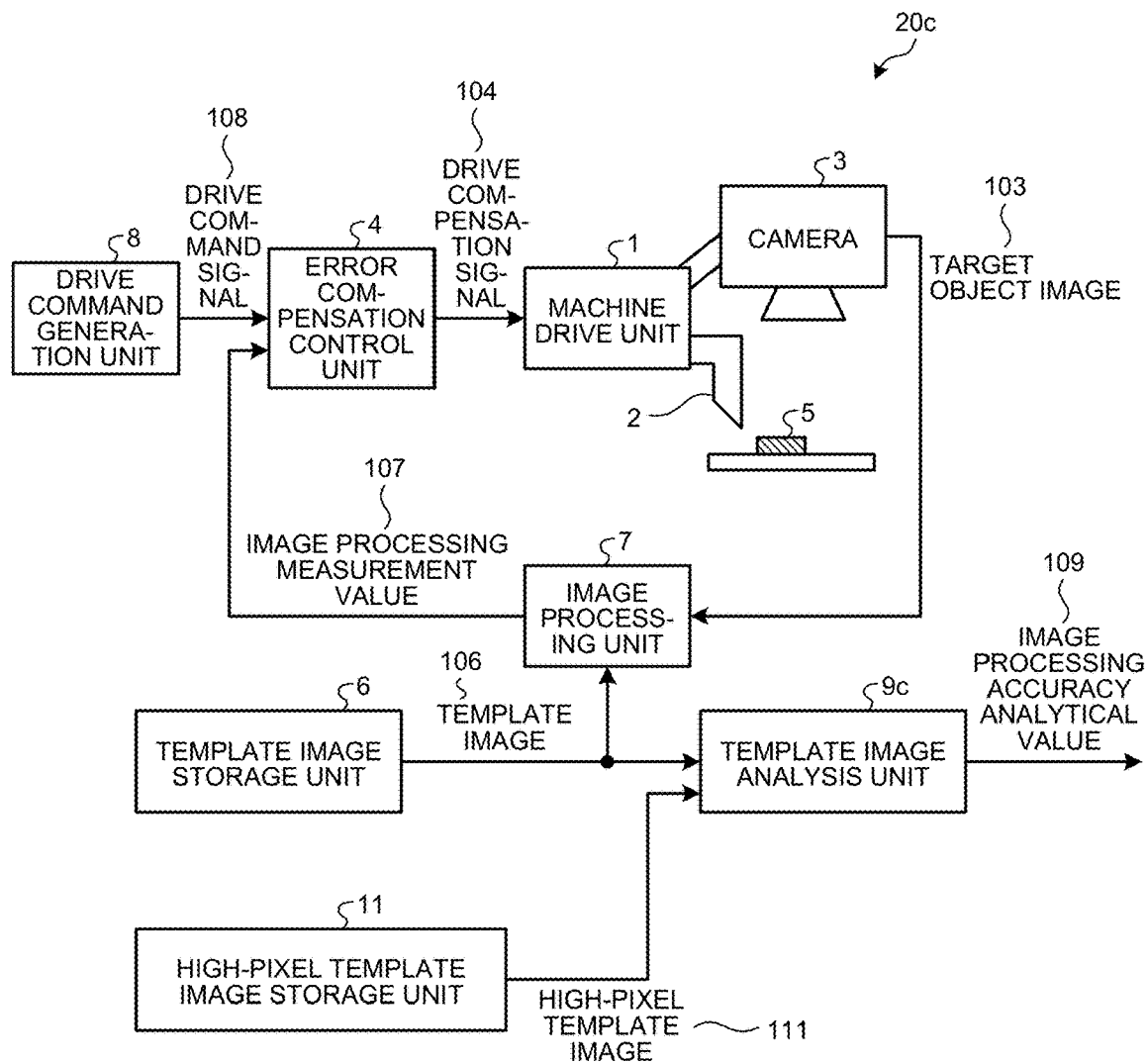
FIG. 11 is a block diagram illustrating an example of a configuration of a visual feedback controller according to a third embodiment.

FIG. 11 is a block diagram illustrating an example of a configuration of a visual feedback controller 20c according to the third embodiment. The visual feedback controller 20c is obtained by modifying the visual feedback controller 20 of the first embodiment illustrated in FIG. 1, that is, replacing the template image analysis unit 9 with a template image analysis unit 9c and further adding a high-pixel template image storage unit 11.

Next, an operation of the visual feedback controller 20c will be described. Note that a flowchart illustrating the operation of the visual feedback controller 20c is similar to the flowchart illustrating the operation of the visual feedback controller 20 of the first embodiment illustrated in FIG. 2. The high-pixel template image storage unit 11 stores a high-pixel template image 111. The high-pixel template image 111 is an image having a higher number of pixels than the template image 106, which is stored in the template image storage unit 6 and used in the image processing by the image processing unit 7, and having the same range as the template image 106. That is, the high-pixel template image storage unit 11 stores the high-pixel template image 111 that is an image obtained by capturing an image in the same range as the imaging range of the template image 106, and is an image obtained by image capture with a resolution higher than that of the template image 106.

Figure 12:
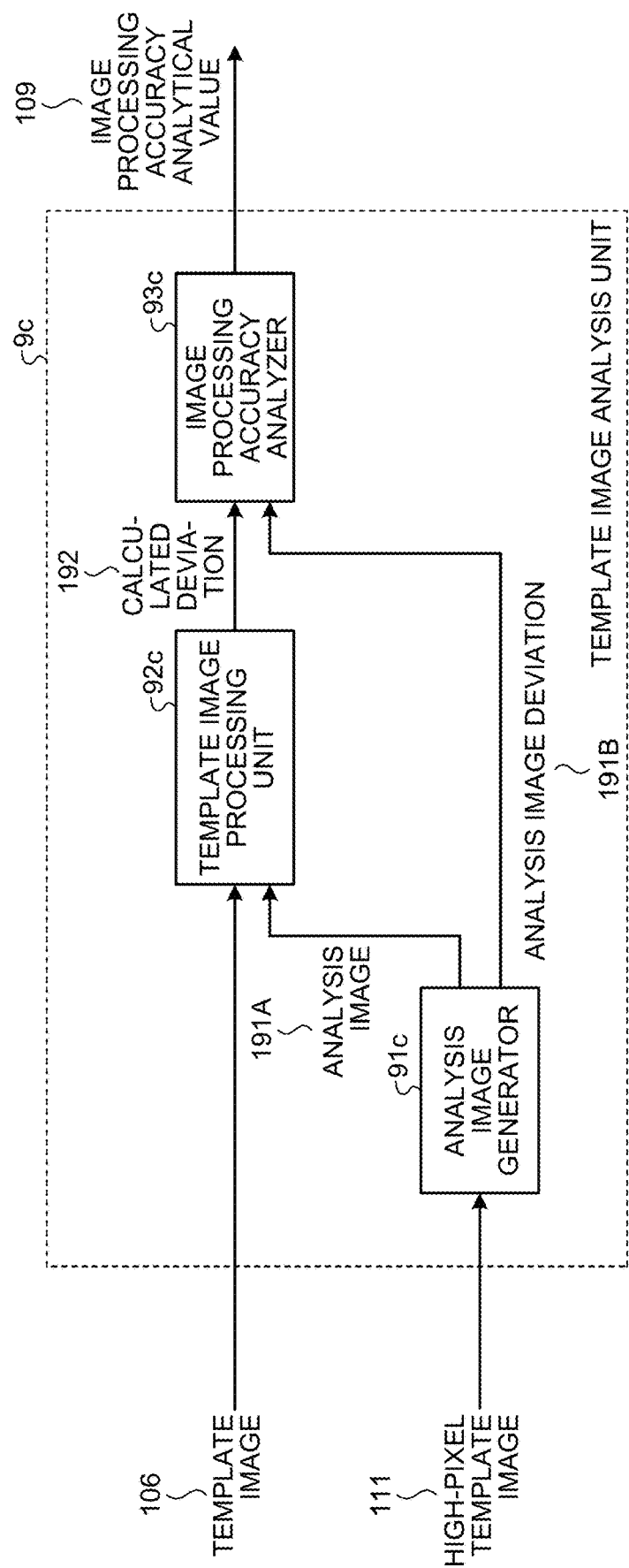
FIG. 12 is a block diagram illustrating an example of a configuration of a template image analysis unit included in the visual feedback controller according to the third embodiment.

The template image analysis unit 9c uses the template image 106 and the high-pixel template image 111 to calculate measurement accuracy of the image processing measurement value 107, and outputs the calculated measurement accuracy as the image processing accuracy analytical value 109. A method of analyzing the template image 106 performed by the template image analysis unit 9c will be described with reference to FIG. 12. FIG. 12 is a block diagram illustrating an example of a configuration of the template image analysis unit 9c included in the visual feedback controller 20c according to the third embodiment. Note that a flowchart illustrating an operation of the template image analysis unit 9c is similar to the flowchart illustrating the operation of the template image analysis unit 9 of the first embodiment illustrated in FIG. 4. The template image analysis unit 9c includes an analysis image generator 91c, a template image processing unit 92c, and an image processing accuracy analyzer 93c.

The analysis image generator 91c generates the analysis image 191A and the analysis image deviation 191B from the high-pixel template image 111, and outputs the analysis image and the analysis image deviation generated (step S21). Specifically, the analysis image generator 91c generates the analysis image 191A by reducing the number of pixels to the same number as that of the template image 106 in a range shifted by a prescribed distance from the high-pixel template image 111. The prescribed distance is not in units of one pixel of the template image 106, but is the number of pixels including a decimal fraction. Moreover, the analysis image generator 91c outputs the prescribed distance as the analysis image deviation 191B.

The template image processing unit 92c calculates and outputs the calculated deviation 192 as a result of image processing using the template image 106 and the analysis image 191A (step S22). Specifically, the template image processing unit 92c uses the template image 106 and the analysis image 191A to perform image processing of the same method as that used by the image processing unit 7, and calculates an amount of deviation between the analysis image 191A and the template image 106. The template image processing unit 92c outputs the calculated amount of deviation as the calculated deviation 192.

The image processing accuracy analyzer 93c calculates the image processing accuracy analytical value 109 from the calculated deviation 192 and the analysis image deviation 191B (step S23). Specifically, from a difference between the calculated deviation 192 and the analysis image deviation 191B, the image processing accuracy analyzer 93c can know the accuracy of the position measurement of the target object 5 when the template image 106 is used in the image processing by the image processing unit 7. The analysis image deviation 191B indicates the distance of the shift when the analysis image 191A is generated from the high-pixel template image 111 having the same range as the template image 106. The image processing accuracy analyzer 93c calculates the image processing accuracy analytical value 109 on the basis of the accuracy of the position measurement.

A hardware configuration of the visual feedback controller 20c will be described. In the visual feedback controller 20c, the high-pixel template image storage unit 11 is a memory. The other configurations of the visual feedback controller 20c are similar to those of the visual feedback controller 20 of the first embodiment.

As described above, according to the present embodiment, in the visual feedback controller 20c, the template image analysis unit 9c analyzes the template image 106 stored in the template image storage unit 6 and the high-pixel template image 111 stored in the high-pixel template image storage unit 11, thereby calculating the image processing accuracy analytical value 109 that allows grasping in advance the accuracy of the image processing measurement value 107 output by the image processing unit 7. As a result, a user of the visual feedback controller 20c can grasp the accuracy of the image processing measurement value 107 output by the image processing unit 7, and can grasp the accuracy when the machine tip 2 is positioned with respect to the target object 5.

Note that, in the present embodiment, the template image analysis unit 9c may generate the analysis image 191A, the analysis image deviation 191B, and the calculated deviation 192 a plurality of times. In this case, the template image analysis unit 9c calculates the image processing accuracy analytical value 109 using the analysis image 191A, the analysis image deviation 191B, and the calculated deviation 192 generated in each processing. The template image analysis unit 9c may output, for example, the worst value among a plurality of the image processing accuracy analytical values 109 calculated as the image processing accuracy analytical value 109.

Moreover, the high-pixel template image storage unit 11 stores the image in the same range as the template image 106 as the high-pixel template image 111, but the present disclosure is not limited thereto. The high-pixel template image storage unit 11 may store, as the high-pixel template image 111, an image in a wider range than the template image 106 as long as the image has a higher number of pixels than the template image 106 when compared therewith over the same range. In this case as well, it is sufficient that the template image analysis unit 9c performs processing similar to that when the high-pixel template image storage unit 11 stores the high-pixel template image 111 in the same range as the template image 106.

Moreover, in the present embodiment, the image processing accuracy analytical value 109 calculated by the template image analysis unit 9c may be used in a visual feedback controller similar to the visual feedback controller 20a of the first embodiment illustrated in FIG. 7. Although not illustrated, in the visual feedback controller, the template image analysis unit 9c outputs the image processing accuracy analytical value 109 calculated to the image processing unit 7a. The image processing unit 7a can output the image processing measurement value 107 rounded at a resolution determined by the image processing accuracy analytical value 109. That is, the image processing unit 7a determines the resolution of the image processing measurement value 107 to be output on the basis of the image processing accuracy analytical value 109. As a result, when generating the drive compensation signal 104 using the image processing measurement value 107, the error compensation control unit 4 does not need to perform calculation using a value having an unnecessarily large number of digits and thus can reduce the calculation load. Fourth Embodiment.

In a fourth embodiment, a visual feedback controller includes a template image generation unit that generates the template image 106. Differences from the third embodiment will be described.

Figure 13:
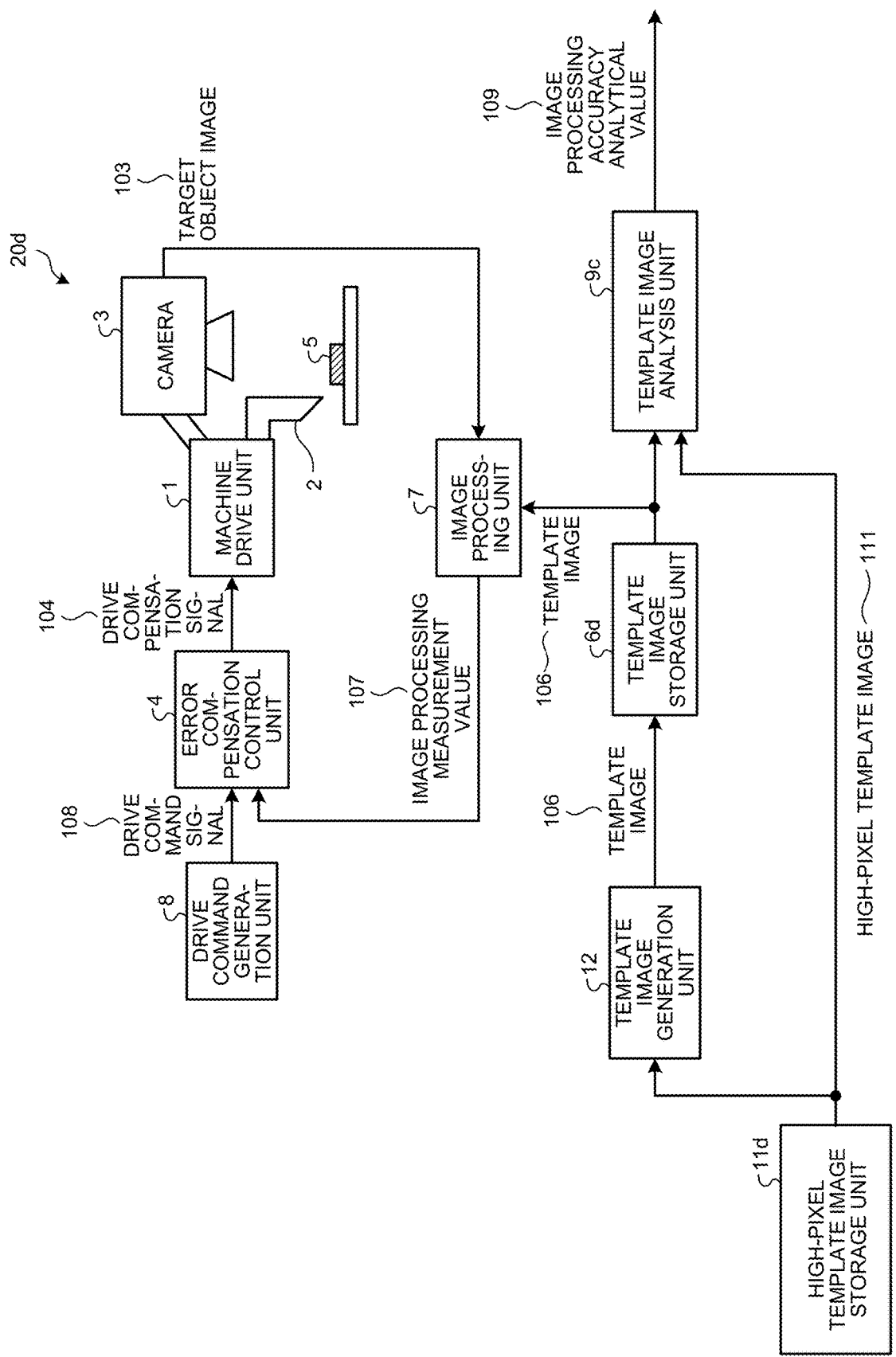
FIG. 13 is a block diagram illustrating an example of a configuration of a visual feedback controller according to a fourth embodiment.

FIG. 13 is a block diagram illustrating an example of a configuration of a visual feedback controller 20d according to the fourth embodiment. The visual feedback controller 20d is obtained by modifying the visual feedback controller 20c of the third embodiment illustrated in FIG. 11, that is, replacing the template image storage unit 6 and the high-pixel template image storage unit 11 with a template image storage unit 6d and a high-pixel template image storage unit 11d, and further adding a template image generation unit 12.

Figure 14:
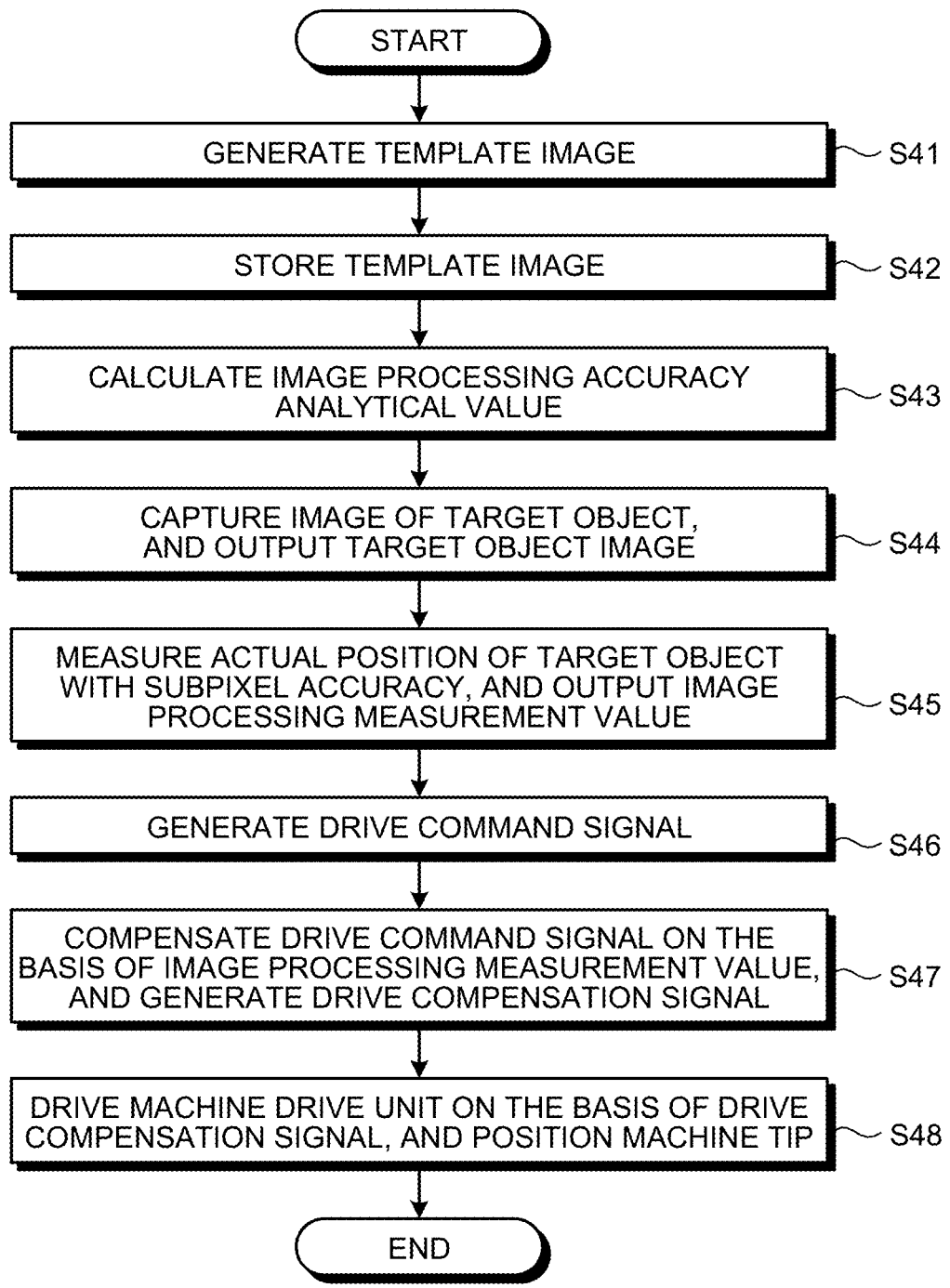
FIG. 14 is a flowchart illustrating an operation of the visual feedback controller according to the fourth embodiment.

Next, an operation of the visual feedback controller 20d will be described. FIG. 14 is a flowchart illustrating the operation of the visual feedback controller 20d according to the fourth embodiment. The high-pixel template image storage unit 11d stores, as the high-pixel template image 111, an image having a higher number of pixels than the template image 106, which is stored in the template image storage unit 6d and used in the image processing by the image processing unit 7, and having the same range as the template image 106. That is, the high-pixel template image storage unit 11d stores the high-pixel template image 111 that is an image obtained by capturing an image in the same range as the imaging range of the template image 106 and is an image obtained by image capture with a resolution higher than that of the template image 106.

The template image generation unit 12 generates the template image 106 from the high-pixel template image 111 (step S41). Specifically, the template image generation unit 12 reduces the number of pixels of the high-pixel template image 111 to generate the template image 106. The template image storage unit 6d stores the template image 106 generated by the template image generation unit 12 (step S42). Subsequent operations from step S43 to step S48 of the visual feedback controller 20d are similar to the operations from step S11 to step S16 of the visual feedback controller 20 of the first embodiment illustrated in FIG. 2. Note that, in the flowchart illustrated in FIG. 14, the visual feedback controller 20d may concurrently perform the operations from step S41 to step S43 and the operation of step S44, or may change the order thereof. The visual feedback controller 20d can repeatedly perform the operations from step S44 to step S48 until the positioning is completed.

The template image analysis unit 9c uses the template image 106 and the high-pixel template image 111 to calculate measurement accuracy of the image processing measurement value 107, and outputs the calculated measurement accuracy as the image processing accuracy analytical value 109. The operation of the template image analysis unit 9c is similar to the operation of the template image analysis unit 9c of the third embodiment. In the template image analysis unit 9c, the analysis image generator 91c generates the analysis image 191A and the analysis image deviation 191B from the high-pixel template image 111. The template image processing unit 92c calculates the calculated deviation 192 as a result of image processing using the template image 106 and the analysis image 191A. The image processing accuracy analyzer 93c calculates the image processing accuracy analytical value 109 from the calculated deviation 192 and the analysis image deviation 191B.

A hardware configuration of the visual feedback controller 20d will be described. In the visual feedback controller 20d, the template image generation unit 12 is implemented by processing circuitry. The processing circuitry may include a memory and a processor executing programs stored in the memory, or may include dedicated hardware. The other configurations of the visual feedback controller 20d are similar to those of the visual feedback controller 20c of the third embodiment.

As described above, according to the present embodiment, in the visual feedback controller 20d, the template image generation unit 12 generates the template image 106 from the high-pixel template image 111 stored in the high-pixel template image storage unit 11d. The template image storage unit 6d stores the template image 106 generated by the template image generation unit 12. The template image analysis unit 9c analyzes the template image 106 stored in the template image storage unit 6d and the high-pixel template image 111 stored in the high-pixel template image storage unit 11d, thereby calculating the image processing accuracy analytical value 109 that allows grasping in advance the accuracy of the image processing measurement value 107 output by the image processing unit 7. As a result, a user of the visual feedback controller [20c] 20d can grasp the accuracy of the image processing measurement value 107 output by the image processing unit 7, and can grasp the accuracy when the machine tip 2 is positioned with respect to the target object 5.

Note that, in the present embodiment, the template image analysis unit 9c may generate the analysis image 191A, the analysis image deviation 191B, and the calculated deviation 192 a plurality of times. In this case, the template image analysis unit 9c calculates the image processing accuracy analytical value 109 using the analysis image 191A, the analysis image deviation 191B, and the calculated deviation 192 generated in each processing. The template image analysis unit 9c may output, for example, the worst value among a plurality of the image processing accuracy analytical values 109 calculated, as the image processing accuracy analytical value 109.

Moreover, the high-pixel template image storage unit 11d stores the image in the same range as the template image 106 as the high-pixel template image 111, but the present disclosure is not limited thereto. The high-pixel template image storage unit 11d may store, as the high-pixel template image 111, an image in a wider range than the template image 106 as long as the image has a higher number of pixels than the template image 106 when compared therewith over the same range. In this case, it is sufficient that the template image generation unit 12 generates the template image 106 by reducing the number of pixels of an image that is obtained by selecting and cutting out a range including the target object 5 from the high-pixel template image 111.

Moreover, in the present embodiment, the image processing accuracy analytical value 109 calculated by the template image analysis unit 9c may be used in a visual feedback controller similar to the visual feedback controller 20a of the first embodiment illustrated in FIG. 7. Although not illustrated, in the visual feedback controller, the template image analysis unit 9c outputs the image processing accuracy analytical value 109 calculated to the image processing unit 7a. The image processing unit 7a can output the image processing measurement value 107 rounded at a resolution determined by the image processing accuracy analytical value 109. That is, the image processing unit 7a determines the resolution of the image processing measurement value 107 to be output on the basis of the image processing accuracy analytical value 109. As a result, when generating the drive compensation signal 104 using the image processing measurement value 107, the error compensation control unit 4 does not need to perform calculation using a value having an unnecessarily large number of digits and thus can reduce the calculation load.

Fifth Embodiment

In a fifth embodiment, in a visual feedback controller, a template image generation unit generates the template image 106 and a candidate template image on the basis of the image processing accuracy analytical value 109. Differences from the fourth embodiment will be described.

Figure 15:
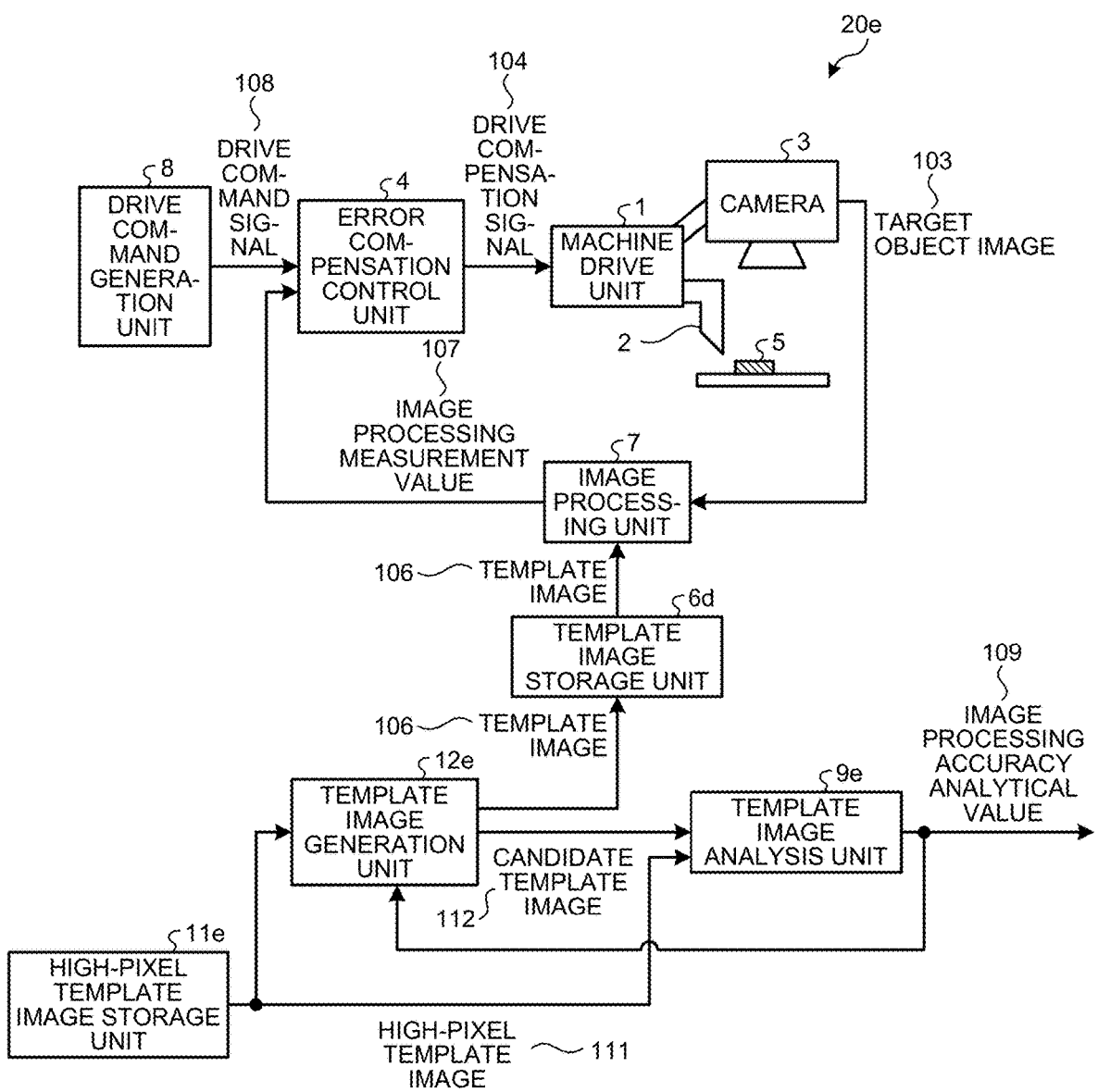
FIG. 15 is a block diagram illustrating an example of a configuration of a visual feedback controller according to a fifth embodiment.

FIG. 15 is a block diagram illustrating an example of a configuration of a visual feedback controller 20e according to the fifth embodiment. The visual feedback controller 20e is obtained by modifying the visual feedback controller 20d of the fourth embodiment illustrated in FIG. 13, that is, replacing the template image analysis unit 9c, the high-pixel template image storage unit 11d, and the template image generation unit 12 with a template image analysis unit 9e, a high-pixel template image storage unit 11e, and a template image generation unit 12e, respectively.

Figure 16:
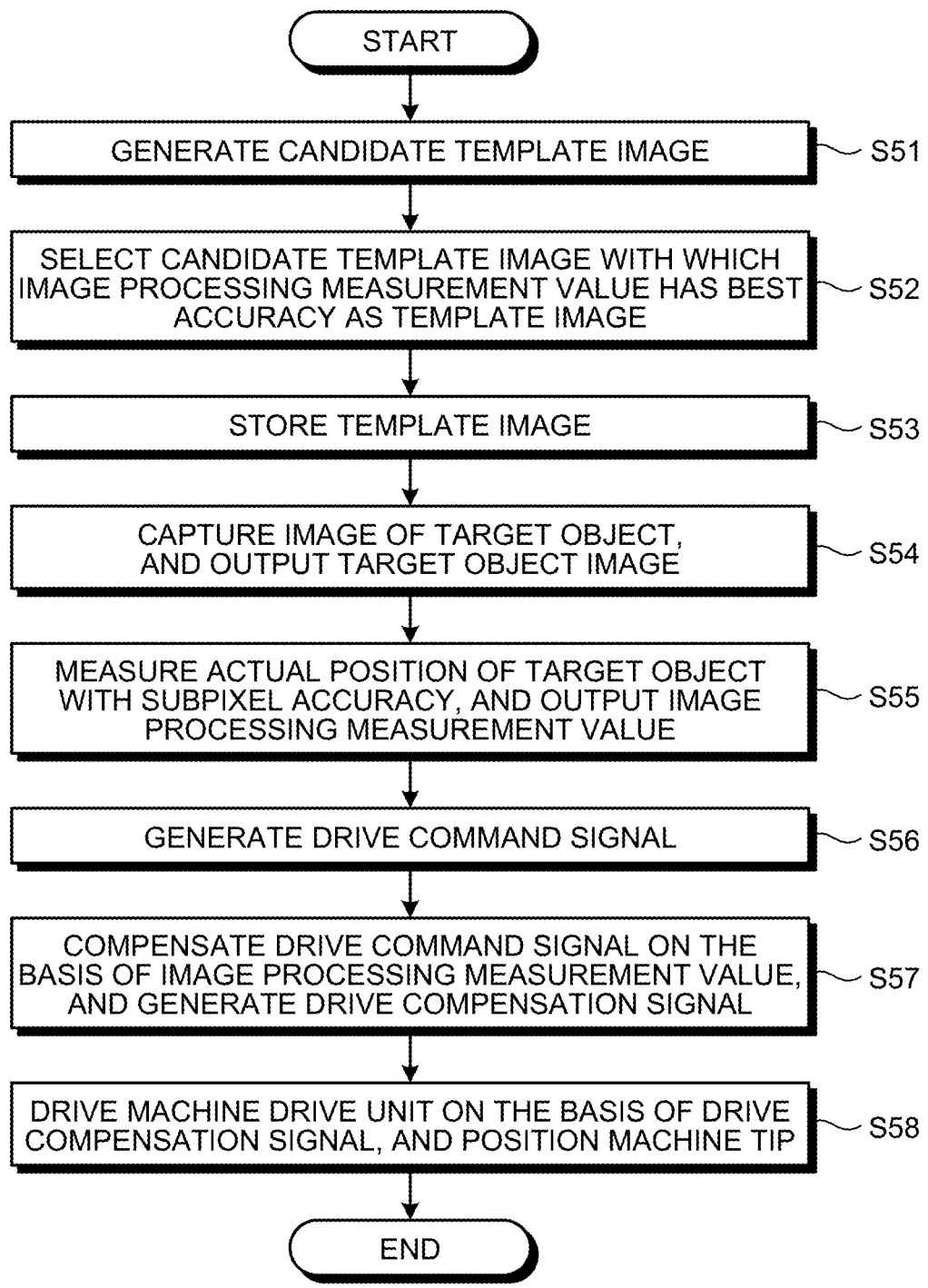
FIG. 16 is a flowchart illustrating an operation of the visual feedback controller according to the fifth embodiment.

Next, an operation of the visual feedback controller 20e will be described. FIG. 16 is a flowchart illustrating the operation of the visual feedback controller 20e according to the fifth embodiment. The high-pixel template image storage unit 11e stores, as the high-pixel template image 111, an image including the target object 5. The image has a wider range than the template image 106, which is stored in the template image storage unit 6d and used in the image processing by the image processing unit 7, and has a higher number of pixels than the template image 106 when compared therewith over the same range. The template image generation unit 12e generates a candidate template image 112 by cutting out an image including the target object 5 from the high-pixel template image 111 and reducing the number of pixels of the image (step S51).

Figure 17:
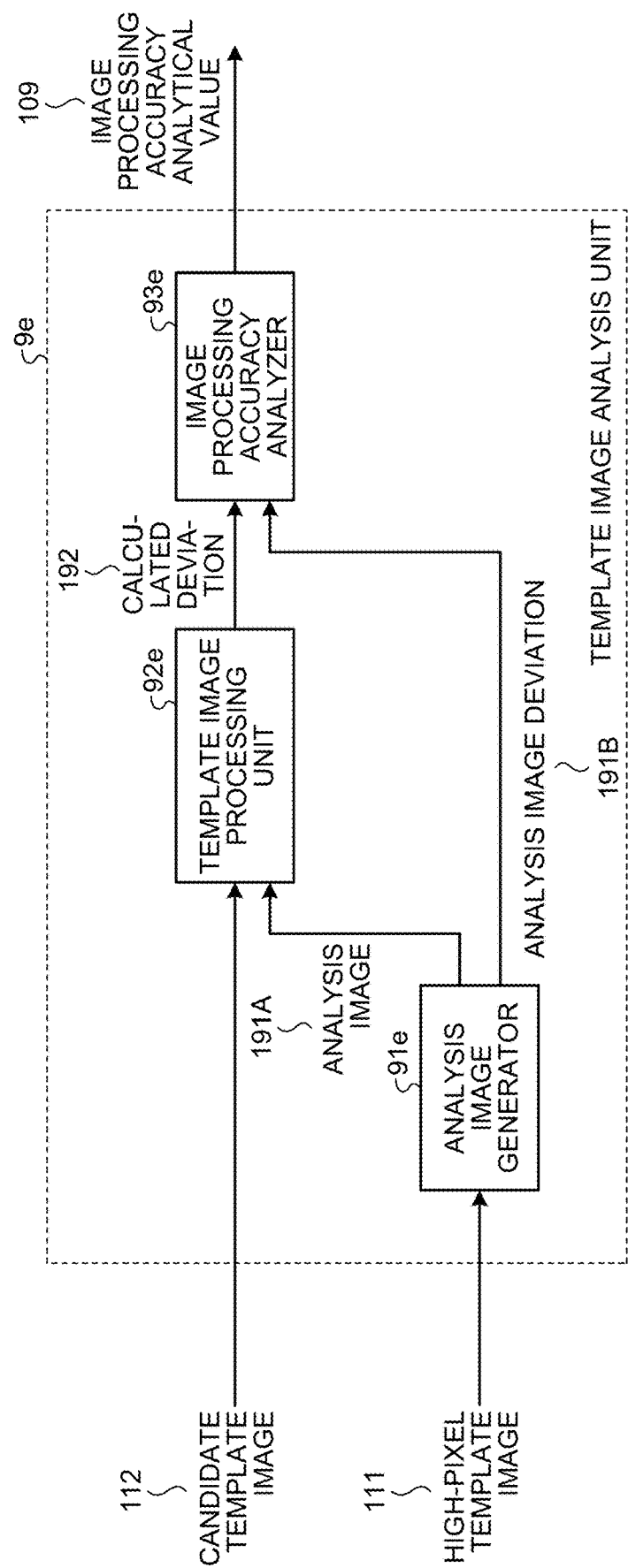
FIG. 17 is a block diagram illustrating an example of a configuration of a template image analysis unit included in the visual feedback controller according to the fifth embodiment.

A method of analyzing the candidate template image 112 by the template image analysis unit 9e will be described with reference to FIG. 17. FIG. 17 is a block diagram illustrating an example of a configuration of the template image analysis unit 9e included in the visual feedback controller 20e according to the fifth embodiment. Note that a flowchart illustrating an operation of the template image analysis unit 9e is similar to the flowchart illustrating the operation of the template image analysis unit 9 of the first embodiment illustrated in FIG. 4. The template image analysis unit 9e includes an analysis image generator 91e, a template image processing unit 92e, and an image processing accuracy analyzer 93e.

The analysis image generator 91e generates the analysis image 191A and the analysis image deviation 191B from the high-pixel template image 111, and outputs the analysis image and the analysis image deviation generated (step S21). Specifically, the analysis image generator 91e uses the high-pixel template image 111 to generate the analysis image 191A by reducing the number of pixels to the same number as that of the candidate template image 112 in a range shifted by a prescribed distance from the candidate template image 112. The prescribed distance is not in units of one pixel of the candidate template image 112, but is the number of pixels including a decimal fraction. Moreover, the analysis image generator 91e outputs the prescribed distance as the analysis image deviation 191B.

The template image processing unit 92e calculates and outputs the calculated deviation 192 as a result of image processing using the candidate template image 112 and the analysis image 191A (step S22). Specifically, the template image processing unit 92e uses the candidate template image 112 and the analysis image 191A to perform image processing of the same method as that used by the image processing unit 7, and calculates an amount of deviation between the analysis image 191A and the candidate template image 112. The template image processing unit 92e outputs the calculated amount of deviation as the calculated deviation 192.

The image processing accuracy analyzer 93e calculates the image processing accuracy analytical value 109 from the calculated deviation 192 and the analysis image deviation 191B (step S23). Specifically, from a difference between the calculated deviation 192 and the analysis image deviation 191B, which is the distance of the shift when the analysis image 191A is generated from the candidate template image 112 known in advance, the image processing accuracy analyzer 93e can know the accuracy of the position measurement of the target object 5 when the candidate template image 112 is used in the image processing by the image processing unit 7. The image processing accuracy analyzer 93e calculates the image processing accuracy analytical value 109 on the basis of the accuracy of the position measurement. In the present embodiment, the image processing accuracy analyzer 93e outputs the image processing accuracy analytical value 109 to the template image generation unit 12e.

The description returns to the operation of the visual feedback controller 20e. After the template image analysis unit 9e calculates the image processing accuracy analytical value 109, the template image generation unit 12e cuts out, from the high-pixel template image 111, an image including the target object 5 in a range different from that of the candidate template image 112 previously generated, reduces the number of pixels of the image, and generates a new piece of the candidate template image 112. The template image generation unit 12e may search for and determine the portion that is cut out to generate the new piece of the candidate template image 112 at random or by using the image processing accuracy analytical value 109 as an evaluation value. The template image analysis unit 9e uses the new piece of the candidate template image 112 and the high-pixel template image 111 to calculate the image processing accuracy analytical value 109 by processing similar to that described above.

The visual feedback controller 20e repeatedly performs the cutout of the candidate template image 112 by the template image generation unit 12e and the calculation of the image processing accuracy analytical value 109 by the template image analysis unit 9e. The template image generation unit 12e uses the image processing accuracy analytical value 109 to select, as the template image 106, the candidate template image 112 with which the image processing measurement value 107 has the highest accuracy (step S52). At this stage, the template image analysis unit 9e calculates the image processing accuracy analytical value 109, as the accuracy of the image processing measurement value 107 output by the image processing unit 7. The template image storage unit 6d stores the template image 106 generated by the template image generation unit 12e (step S53). Subsequent operations from step S54 to step S58 of the visual feedback controller 20e are similar to the operations from step S44 to step S48 of the visual feedback controller 20d of the fourth embodiment illustrated in FIG. 14. Note that, in the flowchart illustrated in FIG. 16, the visual feedback controller 20e may concurrently perform the operations from step S51 to step S53 and the operation of step S54, or may change the order thereof. The visual feedback controller 20e can repeatedly perform the operations from step S54 to step S58 until the positioning is completed.

Here, a description will be made of a method in which the template image generation unit 12e uses the image processing accuracy analytical value 109 as the evaluation value to search for and determine the portion that is cut out to generate the candidate template image 112. As the method in which the template image generation unit 12e searches for and determines the portion that is cut out to generate the candidate template image 112, a genetic algorithm, a particle swarm optimization (PSO), or the like can be considered. Here, as an example, a case where the template image generation unit 12e uses the particle swarm optimization will be described. At this time, a position of each particle used for the calculation of the particle swarm optimization corresponds to the portion cut out to generate the candidate template image 112, and each particle has four pieces of information including the position, speed of movement, a position when the image processing accuracy analytical value 109 has the best value, and the image processing accuracy analytical value 109. The template image generation unit 12e searches for an optimal portion to be cut out for the template image 106 while updating position information of each particle. In this case as well, the visual feedback controller 20e repeats a sequence of cutting out the candidate template image 112 by the template image generation unit 12e and calculating the image processing accuracy analytical value 109 by the template image analysis unit 9e.

In a first sequence, the template image generation unit 12e cuts out, as a plurality of the candidate template images 112, images including the target object 5 from the high-pixel template image 111 stored in the high-pixel template image storage unit 11e. Here, the template image generation unit 12e cuts out the plurality of the candidate template images 112 to be randomly arranged with respect to the high-pixel template image 111. At this time, a portion where the template image generation unit 12e cuts out each candidate template image 112 is set as the position information of each particle.

Using the plurality of the candidate template images 112 and the high-pixel template image 111, the template image analysis unit 9e generates the analysis image 191A from the high-pixel template image 111 for each of the candidate template images 112. The template image analysis unit 9e generates the analysis image 191A by reducing the number of pixels to the same number as that of the candidate template image 112 in a range shifted by a prescribed distance from each of the candidate template images 112. The prescribed distance is the number of pixels including a decimal fraction with respect to the unit of one pixel of the candidate template image 112. The template image analysis unit 9e uses the analysis image 191A to calculate the image processing accuracy analytical value 109 for each of the candidate template images 112.

In a second sequence, the template image generation unit 12e updates the position information of each particle, from the position information of each particle in the first sequence and the image processing accuracy analytical value 109 that is the evaluation value. The template image generation unit 12e also updates the speed of movement of each particle calculated from the amount of shift of the position. The template image generation unit 12e sets, as the position and the image processing accuracy analytical value 109 of the first sequence, the position and the image processing accuracy analytical value 109 when the image processing accuracy analytical value 109 has the best value, respectively. On the basis of the position information of each particle, the template image generation unit 12e generates a new piece of the candidate template image 112 cut out from the high-pixel template image 111. The template image analysis unit 9e uses each of the new piece of the candidate template image 112 and the high-pixel template image 111 to calculate the image processing accuracy analytical value 109 for each of the candidate template images 112.

In third and subsequent sequences, the template image generation unit 12e updates the position information of each particle, the speed of movement, and the position and the image processing accuracy analytical value 109 when the image processing accuracy analytical value 109 has the best value. The update is made from the position information of each particle in the previous sequence, the speed of movement, the position and the image processing accuracy analytical value 109 when the image processing accuracy analytical value 109 has the best value, and the image processing accuracy analytical value 109 in the previous sequence that is the evaluation value. On the basis of the position information of each particle, the template image generation unit 12e generates a new piece of the candidate template image 112 cut out from the high-pixel template image 111. The template image analysis unit 9e uses each of the new piece of the candidate template image 112 and the high-pixel template image 111 to calculate the image processing accuracy analytical value 109 for each of the candidate template images 112.

The visual feedback controller 20e ends the repetition of the sequence upon determining that the third and subsequent sequences have been repeated a prescribed number of times, the best image processing accuracy analytical value 109 of each particle has converged, or the like. As a result, in the visual feedback controller 20e, the template image generation unit 12e can select the best one from the best image processing accuracy analytical values 109 of the particles, and select and output the candidate template image 112 corresponding to the position information as the template image 106.

As described above, the template image generation unit 12e generates the plurality of the candidate template images 112 as candidates of the template image 106 from the high-pixel template image 111, on the basis of the image processing accuracy analytical value 109. The template image analysis unit 9e outputs, as the image processing accuracy analytical value 109 corresponding to each of the candidate template images 112, the measurement accuracy of the image processing measurement value 107 calculated by using each of the plurality of the candidate template images 112 and the high-pixel template image 111. On the basis of the image processing accuracy analytical value 109, the template image generation unit 12e outputs, as the template image 106, the candidate template image 112 corresponding to the image processing measurement value 107 with the highest measurement accuracy.

Note that a hardware configuration of the visual feedback controller 20e is similar to that of the visual feedback controller 20d of the fourth embodiment.

As described above, according to the present embodiment, the visual feedback controller 20e repeats the generation of the candidate template image 112 by the template image generation unit 12e, and the calculation of the image processing accuracy analytical value 109 using the candidate template image 112 and the high-pixel template image 111 by the template image analysis unit 9e. Then, the visual feedback controller 20e selects the candidate template image 112 with the image processing accuracy analytical value 109 being satisfactory, as the template image 106. As a result, the visual feedback controller 20e generates the template image 106 having high measurement accuracy of the actual position for the target position, and can position the machine tip 2 accurately by using the template image 106 with which the image processing measurement value 107 having high accuracy can be obtained.

Note that, in the present embodiment, the template image analysis unit 9e may generate the analysis image 191A, the analysis image deviation 191B, and the calculated deviation 192 a plurality of times. In this case, the template image analysis unit 9e calculates the image processing accuracy analytical value 109 using the analysis image 191A, the analysis image deviation 191B, and the calculated deviation 192 generated in each processing. The template image analysis unit 9e may output, for example, the worst value among a plurality of the image processing accuracy analytical values 109 calculated, as the image processing accuracy analytical value 109.

Moreover, in the present embodiment, the image processing accuracy analytical value 109 calculated by the template image analysis unit 9e may be used in a visual feedback controller similar to the visual feedback controller 20a of the first embodiment illustrated in FIG. 7. Although not illustrated, in the visual feedback controller, the template image analysis unit 9e outputs the image processing accuracy analytical value 109 calculated to the image processing unit 7a. The image processing unit 7a can output the image processing measurement value 107 rounded at a resolution determined by the image processing accuracy analytical value 109. That is, the image processing unit 7a determines the resolution of the image processing measurement value 107 to be output, on the basis of the image processing accuracy analytical value 109. As a result, when generating the drive compensation signal 104 using the image processing measurement value 107, the error compensation control unit 4 does not need to perform calculation using a value having an unnecessarily large number of digits and thus can reduce the calculation load.

The configurations illustrated in the above embodiments merely illustrate an example so that another known technique can be combined, the embodiments can be combined together, or the configurations can be partially omitted and/or modified without departing from the scope.

REFERENCE SIGNS LIST 1 machine drive unit; 2 machine tip; 3 camera; 4 error compensation control unit; 5 target object; 6, 6d template image storage unit; 7, 7a image processing unit; 8 drive command generation unit; 9, 9b, 9c, 9e template image analysis unit; 10 analysis template image storage unit; 11, 11d, 11e high-pixel template image storage unit; 12, 12e template image generation unit; 20, 20a, 20b, 20c, 20d, 20e visual feedback controller; 91, 91c, 91e analysis image generator; 92, 92b, 92c, 92e template image processing unit; 93, 93b, 93c, 93e image processing accuracy analyzer; 103 target object image; 104 drive compensation signal; 106 template image; 107 image processing measurement value; 108 drive command signal; 109 image processing accuracy analytical value; 110A analysis template image; 110B analysis template image deviation; 111 high-pixel template image; 112 candidate template image; 191A analysis image; 191B analysis image deviation; 192 calculated deviation.

The invention claimed is:

1. A visual feedback controller to control a positioning operation that positions a machine tip at a position of a target object, the visual feedback controller comprising:
   a camera to capture an image of the target object and output the captured image as a target object image;
   a template image storage to store a template image obtained by capturing an image of the target object in advance;
   processing circuitry to use the target object image and the template image to measure an actual position of the target object with subpixel accuracy, which provides a higher accuracy than a size of a pixel in the target object image and the template image, and output the measured actual position as an image processing measurement value;
   to generate a drive command signal that is a command for controlling a positioning operation of a machine driver to which the machine tip is connected; and
   to compensate an error of the drive command signal using the image processing measurement value such that the machine tip is positioned at the position of the target object, and generate a drive compensation signal; and
   the machine driver to change a position of the machine tip relative to the target object on the basis of the drive compensation signal;
   wherein
   the processing circuitry generates an analysis image obtained by shifting the template image by an amount having a decimal value with respect to one pixel of the template image;
   uses the analysis image and the template image to measure an amount of deviation between the analysis image and the template image by using the target object image and the template image to measure an actual position of the target object with the subpixel accuracy, and outputs the amount of deviation as a calculated deviation; and
   calculates the image processing accuracy analytical value from an amount of shift of the analysis image with respect to the template image and the calculated deviation.

2. The visual feedback controller according to claim 1, comprising an analysis template image storage to store an analysis template image captured by shifting an imaging range of the template image by a prescribed distance, wherein
   the processing circuitry uses the template image and the analysis template image to output the calculated deviation.

3. The visual feedback controller according to claim 1, comprising a high-pixel template image storage to store a high-pixel template image that is an image obtained by capturing an image of a range wider than an imaging range of the template image, and is an image captured with a higher resolution than the template image, wherein
   the processing circuitry uses the template image and the high-pixel template image to output the calculated deviation.

4. The visual feedback controller according to claim 1, comprising:
   a high-pixel template image storage to store a high-pixel template image that is an image obtained by capturing an image of a range wider than an imaging range of the template image, and is an image captured with a higher resolution than the template image; and wherein
   the processing circuitry generates the template image from the high-pixel template image,
   the template image storage stores the template image generated, and
   the processing circuitry uses the template image and the high-pixel template image to output the calculated deviation.

5. The visual feedback controller according to claim 4, wherein
   the processing circuitry generates a plurality of candidate template images, which is to be candidates of the template image, from the high-pixel template image on the basis of the image processing accuracy analytical value,
   outputs the measurement accuracy of the image processing measurement value, which is calculated using each of the plurality of the candidate template images and the high-pixel template image, as the image processing accuracy analytical value corresponding to each of the candidate template images, and
   outputs, as the template image, the candidate template image corresponding to the image processing measurement value with the highest measurement accuracy, on the basis of the image processing accuracy analytical value.

6. The visual feedback controller according to claim 1, wherein
   the processing circuitry determines a resolution of the image processing measurement value to be output on the basis of the image processing accuracy analytical value.

7. The visual feedback controller according to claim 2, wherein
   the processing circuitry determines a resolution of the image processing measurement value to be output on the basis of the image processing accuracy analytical value.

8. The visual feedback controller according to claim 3, wherein
   the processing circuitry determines a resolution of the image processing measurement value to be output on the basis of the image processing accuracy analytical value.

9. The visual feedback controller according to claim 4, wherein
   the processing circuitry determines a resolution of the image processing measurement value to be output on the basis of the image processing accuracy analytical value.

10. The visual feedback controller according to claim 5, wherein
    the processing circuitry determines a resolution of the image processing measurement value to be output on the basis of the image processing accuracy analytical value.

* * * * *